(12) United States Patent
Honda et al.

(10) Patent No.: US 11,031,601 B2
(45) Date of Patent: Jun. 8, 2021

(54) BATTERY AND CELL STACK

(71) Applicant: Panasonic Intellectual Property Management Co., Ltd., Osaka (JP)

(72) Inventors: Kazuyoshi Honda, Osaka (JP); Akira Kawase, Osaka (JP); Yasutaka Tsutsui, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 102 days.

(21) Appl. No.: 16/412,386

(22) Filed: May 14, 2019

(65) Prior Publication Data

US 2019/0363364 A1 Nov. 28, 2019

(30) Foreign Application Priority Data

May 23, 2018 (JP) .............................. JP2018-098821

(51) Int. Cl.
| | | |
|---|---|---|
| *H01M 4/66* | (2006.01) | |
| *H01M 10/0585* | (2010.01) | |
| *H01M 4/62* | (2006.01) | |
| *H01M 10/48* | (2006.01) | |
| *H01M 10/0562* | (2010.01) | |

(Continued)

(52) U.S. Cl.
CPC .............. *H01M 4/66* (2013.01); *H01M 4/13* (2013.01); *H01M 4/62* (2013.01); *H01M 10/0562* (2013.01); *H01M 10/0585* (2013.01); *H01M 10/482* (2013.01); *H01M 50/116* (2021.01); *H01M 50/183* (2021.01); *H01M 2300/0065* (2013.01)

(58) Field of Classification Search
None
See application file for complete search history.

(56) References Cited

U.S. PATENT DOCUMENTS

2009/0061297 A1 * 3/2009 Kimura ............ H01M 10/0585
429/149
2010/0089636 A1 4/2010 Ramadas et al.
(Continued)

FOREIGN PATENT DOCUMENTS

| JP | 2002-270200 | 9/2002 |
|---|---|---|
| JP | 2007-273350 | 10/2007 |

(Continued)

*Primary Examiner* — Daniel S Gatewood
(74) *Attorney, Agent, or Firm* — Greenblum & Bernstein, P.L.C.

(57) ABSTRACT

A battery includes: a unit cell including an electrode layer, a counter electrode layer, and a solid electrolyte layer; an electrode current collector; an electrode current collector; a counter electrode current collector; and a seal disposed between the electrode current collector and the counter electrode current collector. The thickness of a first stack portion is larger than the thickness of a second stack portion. The first stack portion includes: a first sealing portion that is at least part of the seal; a part of the electrode current collector that overlaps the first sealing portion; and a part of the counter electrode current collector that overlaps the first sealing portion. The second stack portion includes: the unit cell; a part of the electrode current collector that overlaps the unit cell; and a part of the counter electrode current collector that overlaps the unit cell.

17 Claims, 15 Drawing Sheets

(51) Int. Cl.
*H01M 4/13* (2010.01)
*H01M 50/116* (2021.01)
*H01M 50/183* (2021.01)

(56) References Cited

U.S. PATENT DOCUMENTS

2011/0065016 A1   3/2011   Sata et al.
2013/0095388 A1   4/2013   Nakamoto

FOREIGN PATENT DOCUMENTS

| | | |
|---|---|---|
| JP | 2008-010240 | 1/2008 |
| JP | 2009-277448 | 11/2009 |
| JP | 2010-511267 | 4/2010 |
| JP | 2016-033880 | 3/2016 |
| JP | 2017-073374 | 4/2017 |
| WO | 2011/086664 | 7/2011 |
| WO | 2015/025921 | 2/2015 |

\* cited by examiner

BATTERY AND CELL STACK

BACKGROUND

1. Technical Field

The present disclosure relates to a battery and a cell stack.

2. Description of the Related Art

Japanese Unexamined Patent Application Publication No. 2017-73374 discloses a structure in which the thicknesses of positive and negative electrode layers are larger around their central portions in in-plane directions than near their outer circumferential portions in in-plane directions. Japanese Patent No. 5553072 discloses a structure including a seal that prevents an outflow of a liquid hydrophobic phase transition substance. Japanese Unexamined Patent Application Publication No. 2016-33880 discloses a seal that is formed of a sealing material and seals exposed portions of a positive electrode plate, a solid electrolyte layer, and a negative electrode layer.

SUMMARY

In one general aspect, the techniques disclosed here feature a battery including: a unit cell including an electrode layer, a counter electrode layer facing the electrode layer, and a solid electrolyte layer disposed between the electrode layer and the counter electrode layer; an electrode current collector in contact with the electrode layer; a counter electrode current collector in contact with the counter electrode layer; and a seal disposed between the electrode current collector and the counter electrode current collector. The unit cell is disposed between the electrode current collector and the counter electrode current collector. When the battery is viewed in a direction of a thickness of the battery, the electrode current collector includes a first region that does not overlap the electrode layer, the first region including at least part of an outer circumference of the electrode current collector; the counter electrode current collector includes a second region that does not overlap the counter electrode layer, the second region including at least part of an outer circumference of the counter electrode current collector; the seal overlaps the first region and the second region. A thickness of a first stack portion is larger than a thickness of a second stack portion. The first stack portion includes: a first sealing portion that is at least part of the seal; a part of the electrode current collector, the part overlapping the first sealing portion when the battery is viewed in the direction of the thickness of the battery; and a part of the counter electrode current collector, the part overlapping the first sealing portion when the battery is viewed in the direction of the thickness of the battery. The second stack portion includes: the unit cell; a part of the electrode current collector, the part overlapping the unit cell when the battery is viewed in the direction of the thickness of the battery; and a part of the counter electrode current collector, the part overlapping the unit cell when the battery is viewed in the direction of the thickness of the battery.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

Figure 1:
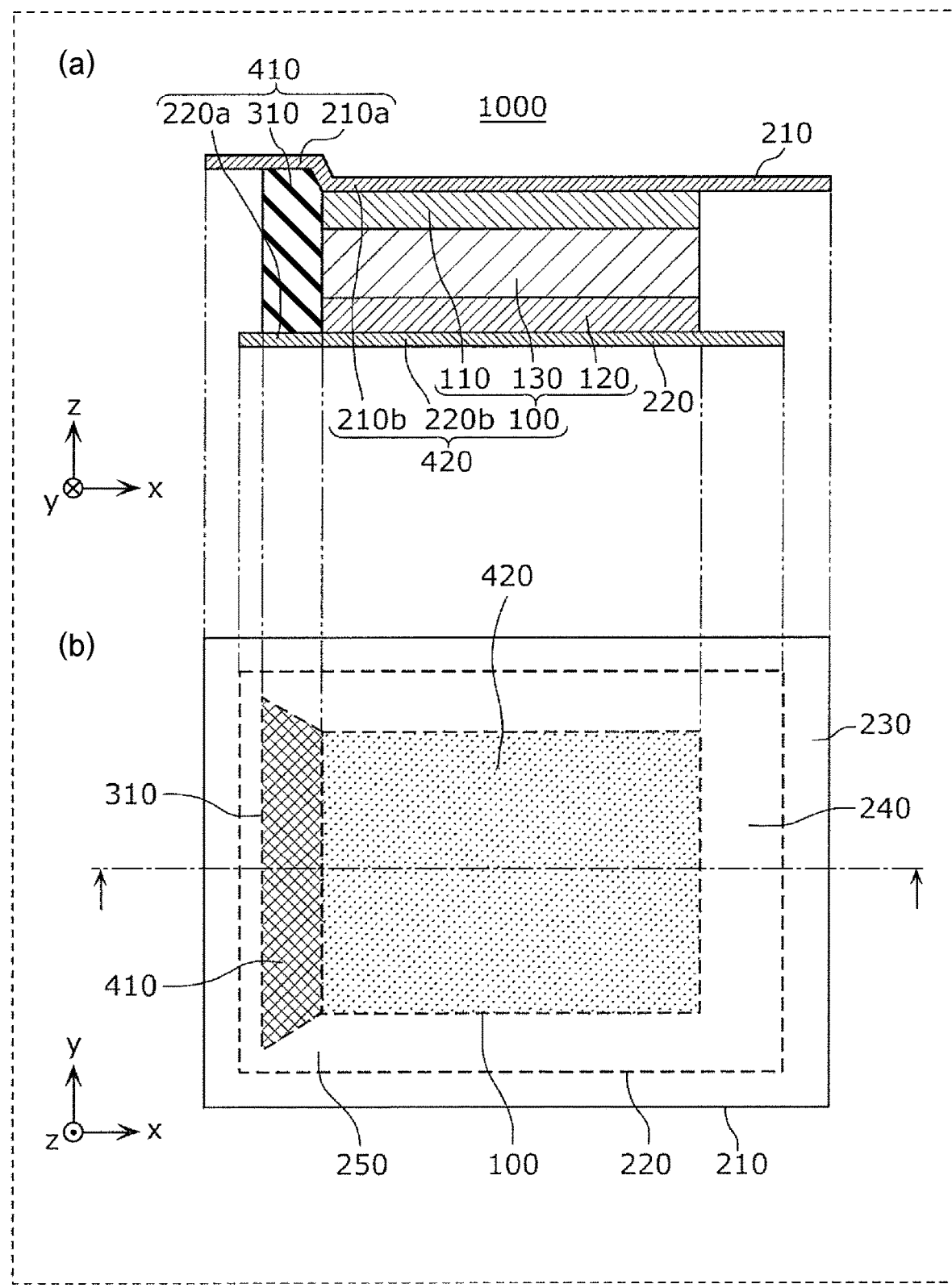
FIG. 1 shows a schematic structure of a battery in embodiment 1.

DETAILED DESCRIPTION (Overview of the Present Disclosure)

A battery in one aspect of the present disclosure includes: a unit cell including an electrode layer, a counter electrode layer facing the electrode layer, and a solid electrolyte layer disposed between the electrode layer and the counter electrode layer; an electrode current collector in contact with the electrode layer; a counter electrode current collector in contact with the counter electrode layer; and a seal disposed between the electrode current collector and the counter electrode current collector. The unit cell is disposed between the electrode current collector and the counter electrode current collector. When the battery is viewed in a direction of a thickness of the battery, the electrode current collector includes a first region that does not overlap the electrode layer, the first region including at least part of an outer circumference of the electrode current collector; the counter electrode current collector includes a second region that does not overlap the counter electrode layer, the second region including at least part of an outer circumference of the counter electrode current collector; the seal overlaps the first region and the second region. A thickness of a first stack portion is larger than a thickness of a second stack portion.

The first stack portion includes: a first sealing portion that is at least part of the seal; a part of the electrode current collector, the part overlapping the first sealing portion when the battery is viewed in the direction of the thickness of the battery; and a part of the counter electrode current collector, the part overlapping the first sealing portion when the battery is viewed in the direction of the thickness of the battery. The second stack portion includes: the unit cell; a part of the electrode current collector, the part overlapping the unit cell when the battery is viewed in the direction of the thickness of the battery; and a part of the counter electrode current collector, the part overlapping the unit cell when the battery is viewed in the direction of the thickness of the battery.

In this case, electrical contact of the cell electrode plates can be improved. Specifically, since the seal is disposed between the electrode current collector and the counter electrode current collector, the spacing between the electrode current collector and the counter electrode current collector around the unit cell serving as an electric power generating element can be maintained at at least a certain distance (e.g., at least the thickness of the seal). Therefore, the electrode current collector and the counter electrode current collector are prevented from coming close to each other around the electric power generating element. Since the thickness T1 of the first stack portion is larger than the thickness T2 of the second stack portion, the possibility that an external force will act directly on the electric power generating element can be reduced. Therefore, when, for example, energizing electrodes are pressed against the battery in order to improve the electrical contact of the cell electrode plates, the pressing force (i.e., external force) is more likely to act on the first stack portion than on the second stack portion. Specifically, since the external force is less likely to act on the second stack portion including the electric power generating element, the risk of breakage of the electric power generating element can be reduced, and good electrical contact can be obtained.

For example, the seal may surround the unit cell.

In this case, the seal can maintain the spacing between the electrode current collector and the counter electrode current collector at at least a certain distance (e.g., at least the thickness of the seal) around the unit cell serving as the electric power generating element. Therefore, the electrode current collector and the counter electrode current collector are prevented from coming close to each other around the electric power generating element.

Moreover, even when one of the electrode current collector and the counter electrode current collector deforms around the electric power generating element, the seal can prevent the one of the electrode current collector and the counter electrode current collector from coming into contact with the other. Therefore, the risk of a short circuit between the electrode layer and the counter electrode layer can be reduced.

In the above structure, the side surfaces of the electric power generating element can be covered with the seal. Therefore, even when, for example, the material forming the electric power generating element partially collapses, the seal can prevent the collapsed component from coming into contact with another component in the battery. This can prevent a short circuit inside the battery caused by the collapse of a component of the battery. The reliability of the battery can thereby be improved.

For example, when the battery is viewed in the direction of the thickness of the battery, the first stack portion may include a plurality of island portions that are separated from each other and located outside the unit cell.

In this case, when an external force is applied to the battery in order to reliably connect the battery to a component in an electric circuit, the external force is received mainly by the first stack portion. Therefore, the stress acting on the unit cell serving as the electric power generating element can be reduced, and the occurrence of delamination and breakage of the electric power generating element can be prevented.

For example, when the battery is viewed in the direction of the thickness of the battery, the first stack portion may have an elongated shape disposed outside the unit cell and extending along an outer circumference of the unit cell.

In this case, since the first stack portion extends along one side of the unit cell serving as the electric power generating element, the area receiving the external force is large. Therefore, the stress acting on the electric power generating element can be further reduced, and the occurrence of delamination and breakage of the electric power generating element can be prevented more effectively.

For example, when the battery is viewed in the direction of the thickness of the battery, the unit cell may have a rectangular shape, and the first stack portion may include two portions located along two opposite sides of the rectangular shape.

In this case, since the first stack portion is disposed so as to extend along the opposite sides of the unit cell serving as the electric power generating element, the stress acting on the electric power generating element can be further reduced, and the occurrence of delamination and breakage of the electric power generating element can be prevented.

For example, when the battery is viewed in the direction of the thickness of the battery, the first stack portion may be disposed continuously over an entire circumference of the unit cell.

In this case, since the first stack portion is disposed continuously over the entire circumference of the unit cell serving as the electric power generating element, the stress acting on the electric power generating element can be reduced sufficiently, and the occurrence of delamination and breakage of the electric power generating element can be prevented more effectively.

For example, the first stack portion may protrude from the second stack portion toward opposite sides in the direction of the thickness of the battery.

In this case, since the first stack portion protrudes toward the opposite sides of the battery, the stress acting on the unit cell serving as the electric power generating element can be further reduced, and the occurrence of delamination and breakage of the electric power generating element can be prevented more effectively.

For example, the seal may be in contact with the unit cell.

In this case, the seal can protect the side surfaces of the electric power generating element of the battery. For example, the seal can prevent partial collapse of an electrode material contained in the electrode layer, a counter electrode material contained in the counter electrode layer, a solid electrolyte material contained in the solid electrolyte layer, etc.

For example, the seal may include a first seal containing a first material and a second seal containing a second material different from the first material. The first seal may be located closer to the electrode current collector than the second seal is, and the second seal may be located closer to the counter electrode current collector than the first seal is.

In this case, the most suitable material for the seal on the positive electrode side and the most suitable material for the seal on the negative electrode side can be selected from the viewpoint of reactivity and mechanical properties. The reliability of the battery can thereby be further improved.

For example, the seal may contain a first material, and the first material may be an electrically insulating material having no ion conductivity.

In this case, since the first material is an electrically insulating material, electrical continuity between the electrode current collector and the counter electrode current collector can be prevented. Since the first material has no ion conductivity, a reduction in cell characteristics caused, for example, by contact between the seal and the seal of another battery can be prevented.

For example, the first material may contain a resin.

In this case, the seal contains the resin (e.g., a sealing agent). Therefore, when an external force is applied to the battery or when the battery is exposed to a humid environment or a gas component, the flexibility, pliability, and gas barrier property of the seal prevent the electric power generating element from being adversely affected. The reliability of the battery can thereby be further improved.

For example, the first material may be at least one selected from the group consisting of epoxy resins, acrylic resins, polyimide resins, and silsesquioxanes.

In this case, the seal can be formed from, for example, an easily curable material. Specifically, the first material contained in the seal is flowable in its original state. When the first material is irradiated with UV rays or subjected to heat treatment, the first material loses its flowability and is then cured. The first material may be optionally pre-cured by heat treatment or irradiation with UV rays and then cured completely by heat treatment, and this allows the thickness of the seal to be maintained easily.

For example, the seal may contain a particulate metal oxide material.

In this case, the characteristics of the seal such as the ability to retain the shape of the battery, insulation performance, thermal conductivity, and moisture-proof properties can be further improved.

For example, the seal may further include a second sealing portion different from the first sealing portion, and a thickness of a third stack portion may be equal to the thickness of the second stack portion. The third stack portion includes: the second sealing portion, a part of the electrode current collector, the part overlapping the second sealing portion when the battery is viewed in the direction of the thickness of the battery; and a part of the counter electrode current collector, the part overlapping the second sealing portion when the battery is viewed in the direction of the thickness of the battery.

In this case, the side surfaces of the electric power generating element can be covered with the seal also in portions other than the first stack portion on which an external force is more likely to act. Therefore, the flexibility, pliability, and gas barrier property of the seal prevent the electric power generating element from being adversely affected more effectively.

A cell stack in another aspect of the present disclosure includes: a first battery; and a second battery stacked on the first battery, wherein each of the first battery and the second battery is the battery in the above aspect of the present disclosure.

In this case, by adjusting the number of stacked batteries and their connection, desired cell characteristics can be obtained. For example, by connecting many batteries in series, a high voltage can be obtained.

For example, a space may be present between the first battery and the second battery.

In this case, the space between the first battery and the second battery functions as a heat dissipation space. For example, a plurality of spaces may be oriented in the same direction. In this case, when, for example, a cooling fan is used, good ventilation is obtained, so that the cell stack can be cooled efficiently. Moreover, the spaces can absorb volume expansion of the batteries caused by charge/discharge. The spaces can be used as channels for electric wiring or optical communications.

For example, the first stack portion of the first battery may be in contact with a portion of the second battery that differs from the first stack portion of the second battery.

In this case, since the first stack portions of the batteries are stacked in a hash symbol shape, the mechanical strength of the cell stack is further improved. Specifically, the mechanical strength of the electric power generating elements in the cell stack against an external force can be further increased.

Embodiments of the present disclosure will be described with reference to the drawings.

The embodiments described below show general or specific examples. Numerical values, shapes, materials, components, arrangements and connections of the components, steps, the order of the steps, etc. shown in the following embodiments are merely examples and are not intended to limit the present disclosure. Among the components in the following embodiments, components not described in independent claims will be described as optional components.

The drawings are schematic drawings and are not necessarily strictly accurate illustrations. Therefore, the scales etc. in the drawings do not always agree with each other. In the drawings, the same reference numerals are given to substantially the same components, and redundant description thereof will be omitted or simplified.

In the present specification, terms, such as parallel, representing the relations between components, terms, such as rectangular, representing the shapes of components, and numerical ranges do not represent only their strict meanings but are intended to include those in substantially the same range, e.g., with a few percent difference.

In the present specification, the terms "above" and "below" do not refer to an upward direction (vertically above) and a downward direction (vertically below) in space recognition in an absolute manner but are used to define relative positional relations based on the stacking order in a stack structure. The terms "above" and "below" are used not only when two components are disposed with a space therebetween and another component is present between the two components but also when two components are disposed in contact with each other.

In the present specification and the drawings, x, y, and z axes are the three axes of a three-dimensional orthogonal coordinate system. In each embodiment, the z axis direction is the direction of the thickness of the battery. In the present specification, the "thickness direction" is a direction perpendicular to a surface of the electrode current collector on which the electrode layer is formed or a surface of the counter electrode current collector on which the counter electrode layer is formed. In the present specification, "in plan view" means that the battery is viewed in the direction of the thickness of the battery.

Embodiment 1

[Structure]

FIG. 1 shows a schematic structure of a battery 1000 in embodiment 1. Specifically, FIG. 1(*a*) is a cross-sectional view illustrating the schematic structure of the battery 1000 and shows a cross section at a position indicated by a dash-dot line in FIG. 1(*b*). FIG. 1(*b*) is a transparent top view showing the schematic structure of the battery 1000.

In FIG. 1(*b*), the shapes of components of the battery 1000 in plan view when the battery 1000 is viewed from above are represented by solid or broken lines. To facilitate the understanding of the shapes of a first stack portion 410 and a second stack portion 420 of the battery 1000 in plan view, the first stack portion 410 and the second stack portion 420 are shaded.

As shown in FIG. 1, the battery 1000 in embodiment 1 includes an electric power generating element 100, an electrode current collector 210, a counter electrode current collector 220, and a seal 310. The battery 1000 has the first stack portion 410 and the second stack portion 420.

The electric power generating element 100 is, for example, an electric power generating unit having a charge/discharge function. The electric power generating element 100 is, for example, a secondary cell. For example, the electric power generating element 100 may be a unit cell (cell). The electric power generating element 100 is disposed between the electrode current collector 210 and the counter electrode current collector 220.

As shown in FIG. 1(*a*), the electric power generating element 100 includes an electrode layer 110 and a counter electrode layer 120. The electric power generating element 100 further includes an electrolyte layer 130. The electrode layer 110, the electrolyte layer 130, and the counter electrode layer 120 are stacked in this order in the direction of the thickness of the battery 1000 (the z axis direction).

In the electric power generating element 100 in embodiment 1, the electrode layer 110 is the negative electrode of the battery, and the counter electrode layer 120 is the positive electrode of the battery. In this case, the electrode current collector 210 is a negative electrode current collector. The counter electrode current collector 220 is a positive electrode current collector.

The electrode layer 110 is, for example, a layer containing an electrode material such as an active material. Specifically, the electrode layer 110 is, for example, a negative electrode active material layer containing a negative electrode active material as the electrode material. The electrode layer 110 is disposed so as to face the counter electrode layer 120.

The negative electrode active material contained in the electrode layer 110 may be, for example, graphite, metallic lithium, etc. The negative electrode active material used may be any of various materials capable of occluding and releasing ions such as lithium (Li) or magnesium (Mg) ions.

For example, a solid electrolyte such as an inorganic solid electrolyte may be used as a constituent material of the electrode layer 110. The inorganic solid electrolyte used may be a sulfide solid electrolyte or an oxide solid electrolyte. For example, a mixture of lithium sulfide ($Li_2S$) and diphosphorus pentasulfide ($P_2S_5$) can be used as the sulfide solid electrolyte. A conductive material such as acetylene black or a binder such as polyvinylidene fluoride may be used as a constituent material of the electrode layer 110.

The electrode layer 110 may be produced by coating a surface of the electrode current collector 210 with a paste-like coating containing a solvent and the constituent materials of the electrode layer 110 mixed with the solvent and drying the paste. To increase the density of the electrode layer 110, an electrode plate including the electrode layer 110 and the electrode current collector 210 (a negative electrode plate in the present embodiment) may be pressed after drying. The thickness of the electrode layer 110 is, for example, from 5 μm to 300 μm inclusive, but this is not a limitation.

The counter electrode layer 120 is, for example, a layer containing a counter electrode material such as an active material. The counter electrode material forms the counter electrode for the electrode layer. Specifically, the counter electrode layer 120 is, for example, a positive electrode active material layer containing a positive electrode active material as the counter electrode material.

The positive electrode active material contained in the counter electrode layer 120 may be, for example, lithium cobaltate ($LiCoO_2$) or lithium nickelate ($LiNiO_2$). The positive electrode active material used may be any of various materials capable of occluding and releasing ions such as Li or Mg ions. The positive electrode active material contained in the counter electrode layer 120 may be, for example, lithium cobaltate complex oxide (LCO), lithium nickelate complex oxide (LNO), lithium manganate complex oxide (LMO), lithium-manganese-nickel complex oxide (LMNO), lithium-manganese-cobalt complex oxide (LMCO), lithium-nickel-cobalt complex oxide (LNCO), or lithium-nickel-manganese-cobalt complex oxide (LNMCO).

For example, a solid electrolyte such as an inorganic solid electrolyte may be used as a constituent material of the counter electrode layer 120. The inorganic solid electrolyte used may be a sulfide solid electrolyte or an oxide solid electrolyte. For example, a mixture of $Li_2S$ and $P_2S_5$ can be used as the sulfide electrolyte. The surface of the positive electrode active material may be coated with the solid electrolyte. A conductive material such as acetylene black or a binder such as polyvinylidene fluoride may be used as a constituent material of the counter electrode layer 120.

The counter electrode layer 120 may be produced by coating a surface of the counter electrode current collector 220 with a paste-like coating containing a solvent and the constituent materials of the counter electrode layer 120 mixed with the solvent and drying the paste. To increase the density of the counter electrode layer 120, a counter electrode plate including the counter electrode layer 120 and the counter electrode current collector 220 (a positive electrode plate in the present embodiment) may be pressed after drying. The thickness of the counter electrode layer 120 is, for example, from 5 μm to 300 μm inclusive, but this is not a limitation.

The electrolyte layer 130 is disposed between the electrode layer 110 and the counter electrode layer 120. The electrolyte layer 130 is in contact with the electrode layer 110 and with the counter electrode layer 120. The electrolyte layer 130 contains an electrolyte material. The electrolyte material used may be a well-known electrolyte used for batteries. The thickness of the electrolyte layer 130 may be from 5 μm to 300 μm inclusive or from 5 μm to 100 μm inclusive.

The size of the electrolyte layer 130 and its shape in plan view are the same as the size of the electrode layer 110 and the counter electrode layer 120 and their shape in plan view. Specifically, the edges (side surfaces) of the electrolyte layer 130 are flush with the edges (side surfaces) of the electrode layer 110 and with the edges (side surfaces) of the counter electrode layer 120.

The electrolyte material may be, for example, a solid electrolyte. Specifically, the electrolyte layer 130 included in the electric power generating element 100 may be a solid electrolyte layer. The electric power generating element 100 may be, for example, an all-solid-state battery.

The solid electrolyte used may be, for example, an inorganic solid electrolyte. The inorganic solid electrolyte used may be a sulfide solid electrolyte or an oxide solid electrolyte. For example, a mixture of $Li_2S$ and $P_2S_5$ can be used as the sulfide solid electrolyte. The electrolyte layer 130 may contain, in addition to the electrolyte material, a binder such as polyvinylidene fluoride etc.

In embodiment 1, the electrode layer 110, the counter electrode layer 120, and the electrolyte layer 130 are held as parallel flat plates. Therefore, the occurrence of cracking or collapse due to bending can be prevented. The electrode layer 110, the counter electrode layer 120, and the electrolyte layer 130 may be smoothly bent together.

In the electric power generating element 100, the electrode layer 110 may be the positive electrode of the battery, and the counter electrode layer 120 may be the negative electrode of the battery. Specifically, the electrode layer 110 may be a positive electrode active material layer containing a positive electrode active material as the electrode material. In this case, the electrode current collector 210 is a positive electrode current collector. The counter electrode layer 120 is a negative electrode active material layer containing a negative electrode active material as the counter electrode material. The counter electrode current collector 220 is a negative electrode current collector.

In embodiment 1, the electrode layer 110 and the counter electrode layer 120 have the same size and the same shape. In plan view, the electric power generating element 100 is smaller than the electrode current collector 210 and the counter electrode current collector 220 and is located inside the electrode current collector 210 and the counter electrode current collector 220.

The electrode current collector 210 and the counter electrode current collector 220 are electrically conductive members. The electrode current collector 210 and the counter electrode current collector 220 may be, for example, electrically conductive thin films. The material used to form the electrode current collector 210 and the counter electrode current collector 220 may be, for example, a metal such as stainless steel (SUS), aluminum (Al), or copper (Cu).

The electrode current collector 210 is disposed in contact with the electrode layer 110. As described above, the electrode current collector 210 is the negative electrode current collector. Metal foil such as SUS foil or Cu foil may be used for the negative electrode current collector. The thickness of the electrode current collector 210 is, for example, from 5 μm to 100 μm inclusive, but this is not a limitation. The electrode current collector 210 may include, for example, a current collector layer containing an electrically conductive material and disposed in a portion in contact with the electrode layer 110.

In plan view, the electrode current collector 210 is larger than the electrode layer 110. In FIG. 1(*b*), a first region 230 is shown, which is a region that includes at least part of the outer circumference of the electrode current collector 210 and does not overlap the electrode layer 110. In embodiment 1, since the electrode layer 110 is located at the center of the electrode current collector 210 in plan view, the first region 230 is provided over the entire circumference of the electrode current collector 210. Specifically, in plan view, the first region 230 has a rectangular ring shape with a prescribed width.

The counter electrode current collector 220 is disposed in contact with the counter electrode layer 120. As described above, the counter electrode current collector 220 is the positive electrode current collector. Metal foil such as SUS foil or Al foil may be used for the positive electrode current collector. The thickness of the counter electrode current collector 220 is, for example, from 5 μm to 100 μm inclusive, but this is not a limitation. The counter electrode current collector 220 may include a current collector layer disposed in a portion in contact with the counter electrode layer 120.

In plan view, the counter electrode current collector 220 is larger than the counter electrode layer 120. In FIG. 1(*b*), a second region 240 is shown, which is a region that includes at least part of the outer circumference of the counter electrode current collector 220 and does not overlap the counter electrode layer 120. In embodiment 1, since the counter electrode layer 120 is located at the center of the counter electrode current collector 220 in plan view, the second region 240 is provided over the entire circumference of the counter electrode current collector 220. Specifically, in plan view, the second region 240 has a rectangular ring shape with a prescribed width. In embodiment 1, the width of the rectangular ring-shaped second region 240 is narrower than the width of the rectangular ring-shaped first region 230.

A facing region 250 shown in FIG. 1(*b*) is a region in which the electrode current collector 210 faces the counter electrode current collector 220. Specifically, the facing region 250 is a region in which, in plan view, the electrode current collector 210 overlaps the counter electrode current collector 220. In embodiment 1, the counter electrode current collector 220 is smaller than the electrode current collector 210, and the counter electrode current collector 220 is located inside the electrode current collector 210 in plan view. In this case, the shape of the facing region 250 in plan view is the same as the shape of the counter electrode current collector 220 in plan view. In embodiment 1, the facing region 250 is a region composed of the second region 240 and a region in which the electric power generating element 100 is disposed.

In embodiment 1, the electrode current collector 210 and the counter electrode current collector 220 face each so as to be flat and parallel in at least a portion including the electric power generating element 100. Specifically, the counter electrode current collector 220 is a flat plate with a uniform thickness. The electrode current collector 210 is a plate with a uniform thickness and having a step. As shown in FIG. 1(*a*), the electrode current collector 210 has a first plate portion 210*a* and a second plate portion 210*b*. The first plate portion 210*a* and the second plate portion 210*b* are flat plate portions with a uniform thickness and are disposed parallel to the counter electrode current collector 220.

The first plate portion 210*a* is a part of the electrode current collector 210 and overlaps the seal 310 in plan view. The first plate portion 210*a* is located in the first region 230 of the electrode current collector 210 in plan view. Specifically, the electrode layer 110 is not disposed on the first plate portion 210*a*. The first plate portion 210*a* is included in the first stack portion 410 of the battery 1000.

The second plate portion 210*b* is a part of the electrode current collector 210 and overlaps the electric power generating element 100 in plan view. Specifically, the electrode layer 110 is disposed on the second plate portion 210*b*. The second plate portion 210*b* is included in the second stack portion 420 of the battery 1000. The thickness of the second plate portion 210*b* is the same as the thickness of the first plate portion 210*a*.

The first plate portion 210a and the second plate portion 210b are located at different positions in the direction of the thickness of the battery 1000. Specifically, the first plate portion 210a is located farther from the counter electrode current collector 220 in the thickness direction than the second plate portion 210b. In other words, the distance between the first plate portion 210a and the counter electrode current collector 220 is longer than the distance between the second plate portion 210b and the counter electrode current collector 220. A connection portion between the first plate portion 210a and the second plate portion 210b may be orthogonal to the first plate portion 210a and the second plate portion 210b or may be obliquely intersect them.

As shown in FIG. 1(a), the counter electrode current collector 220 has a first plate portion 220a and a second plate portion 220b. The first plate portion 220a and the second plate portion 220b are flat portions with a uniform thickness. Since the counter electrode current collector 220 is a flat plate, the first plate portion 220a and the second plate portion 220b are located at the same position in the direction of the thickness of the battery 1000.

The first plate portion 220a is a part of the counter electrode current collector 220 and overlaps the seal 310 in plan view. In plan view, the first plate portion 220a is located in the second region 240 of the counter electrode current collector 220. Specifically, the counter electrode layer 120 is not disposed on the first plate portion 220a. The first plate portion 220a is included in the first stack portion 410 of the battery 1000.

The second plate portion 220b is a part of the counter electrode current collector 220 and overlaps the electric power generating element 100 in plan view. Specifically, the counter electrode layer 120 is disposed on the second plate portion 220b. The second plate portion 220b is included in the second stack portion 420 of the battery 1000. The thickness of the second plate portion 220b is the same as the thickness of the first plate portion 220a.

The seal 310 is disposed between the electrode current collector 210 and the counter electrode current collector 220. The seal 310 is formed using, for example, an electrically insulating material. The seal 310 functions as a spacer that maintains the spacing between the electrode current collector 210 and the counter electrode current collector 220. The seal 310 is used to seal the electric power generating element 100 between the electrode current collector 210 and the counter electrode current collector 220. The seal 310 seals at least part of the electric power generating element 100 such that the at least part of the electric power generating element 100 is not in contact with outside air.

As shown in FIG. 1(a), in embodiment 1, the seal 310 is in contact with the electrode current collector 210 and the counter electrode current collector 220. Specifically, the seal 310 is in contact with the surface of the electrode current collector 210 on which the electrode layer 110 is disposed and is located within the first region 230 in which the electrode layer 110 is not disposed. More specifically, the seal 310 is in contact with the first plate portion 210a of the electrode current collector 210. The seal 310 is in contact with the surface of the counter electrode current collector 220 on which the counter electrode layer 120 is disposed and is located within the second region 240 in which the counter electrode layer 120 is not disposed. More specifically, the seal 310 is in contact with the first plate portion 220a of the counter electrode current collector 220. In plan view, the seal 310 is located in a position in which the first region 230 and the second region 240 face each other. In embodiment 1, the seal 310 has a uniform thickness.

In the structure described above, the seal 310 can maintain the distance between the electrode current collector 210 and the counter electrode current collector 220 more reliably at at least a certain distance (e.g., at least the thickness of the seal 310). Therefore, the electrode current collector 210 and the counter electrode current collector 220 are more effectively prevented from coming close to each other. This can further reduce the risk of a short circuit between the electrode layer 110 and the counter electrode layer 120 caused by direct contact between the electrode current collector 210 and the counter electrode current collector 220.

As shown in FIG. 1(a), in embodiment 1, the seal 310 is in contact with the electric power generating element 100. Specifically, the seal 310 is in contact with a side surface of at least one of the electrode layer 110, the counter electrode layer 120, and the electrolyte layer 130. For example, the seal 310 is in contact with a side surface of the electrode layer 110, a side surface of the counter electrode layer 120, and a side surface of the electrolyte layer 130.

For example, as shown in FIG. 1(b), when the electric power generating element 100 has a rectangular shape in plan view, the seal 310 may be in contact with one side of the rectangular plan-view shape of the electric power generating element 100. As shown in FIG. 1(b), in embodiment 1, the seal 310 has a trapezoidal shape in plan view, but this is not a limitation.

For example, the seal 310 contains a first material. For example, the seal 310 may contain the first material as its main component. For example, the seal 310 may be composed only of the first material.

The first material used may be a well-known material for the seal of a battery such as a sealing agent. The first material used may be a resin material. The first material may be an insulating material having no ion conductivity. For example, the first material may be at least one of epoxy resins, acrylic resins, polyimide resins, and silsesquioxanes.

The seal 310 may contain a particulate metal oxide material. Examples of the metal oxide material that can be used include silicon oxide, aluminum oxide, titanium oxide, zinc oxide, cerium oxide, iron oxide, tungsten oxide, zirconium oxide, calcium oxide, zeolite, and glass. For example, the seal 310 may be formed using a resin material in which a plurality of particles formed of the metal oxide material are dispersed.

It is only necessary that the particle size of the metal oxide material be equal to or less than the spacing between the electrode current collector 210 and the counter electrode current collector 220. The metal oxide material particles may have a perfect circular shape (spherical shape), a spheroidal shape, or a rod shape.

As shown in FIG. 1(a), the battery 1000 has different thicknesses at different positions. Specifically, T1>T2 holds, where T1 is the thickness of the first stack portion 410, and T2 is the thickness of the second stack portion 420. For example, the difference between T1 and T2 is equal to or larger than the thickness of at least one of the electrode current collector 210 and the counter electrode current collector 220. The difference between T1 and T2 may be equal to or larger than the sum of the thickness of the electrode current collector 210 and the thickness of the counter electrode current collector 220. For example, the ratio of the difference between T1 and T2 to T2 ((T1−T2)/T2) may be 3% or more and may be 5% or more. (T1−T2)/T2 may be 30% or less and may be 20% or less.

The first stack portion 410 includes a first sealing portion that is at least part of the seal 310 and further includes a portion of the electrode current collector 210 and a portion of the counter electrode current collector 220 that overlap the first sealing portion when the battery 1000 is viewed in its thickness direction (i.e., in plan view). For example, the first stack portion 410 includes the seal 310, the first plate portion 210a of the electrode current collector 210, and the first plate portion 220a of the counter electrode current collector 220. In embodiment 1, the first sealing portion corresponds to the entire seal 310. Specifically, the shape of the first stack portion 410 in plan view is the same as the shape of the seal 310 in plan view.

The second stack portion 420 includes the electric power generating element 100 and further includes a portion of the electrode current collector 210 and a portion of the counter electrode current collector 220 that overlap the electric power generating element 100 when the battery 1000 is viewed in its thickness direction (i.e., in plan view). For example, the second stack portion 420 includes the electric power generating element 100, the second plate portion 210b of the electrode current collector 210, and the second plate portion 220b of the counter electrode current collector 220. Specifically, the shape of the second stack portion 420 in plan view is the same as the shape of the electric power generating element 100 in plan view.

In the structure described above, since the thickness T1 of the first stack portion 410 is larger than the thickness T2 of the second stack portion 420, the possibility that an external force will act directly on the electric power generating element 100 can be reduced. When, for example, energizing electrodes are pressed against the battery 1000 in order to improve electrical contact of the electrode plates, the pressing force is more likely to act on the first stack portion 410 than on the second stack portion 420. Specifically, since the external force is less likely to act on the second stack portion 420 including the electric power generating element 100, the risk of breakage of the electric power generating element 100 can be reduced, and good electrical contact can be obtained.

[Modifications]

A plurality of modifications of embodiment 1 will be described. In the following description of the plurality of modifications, differences from embodiment 1 and differences between modifications will be mainly described, and the description of common features will be omitted or simplified.

<Modification 1>

Figure 2:
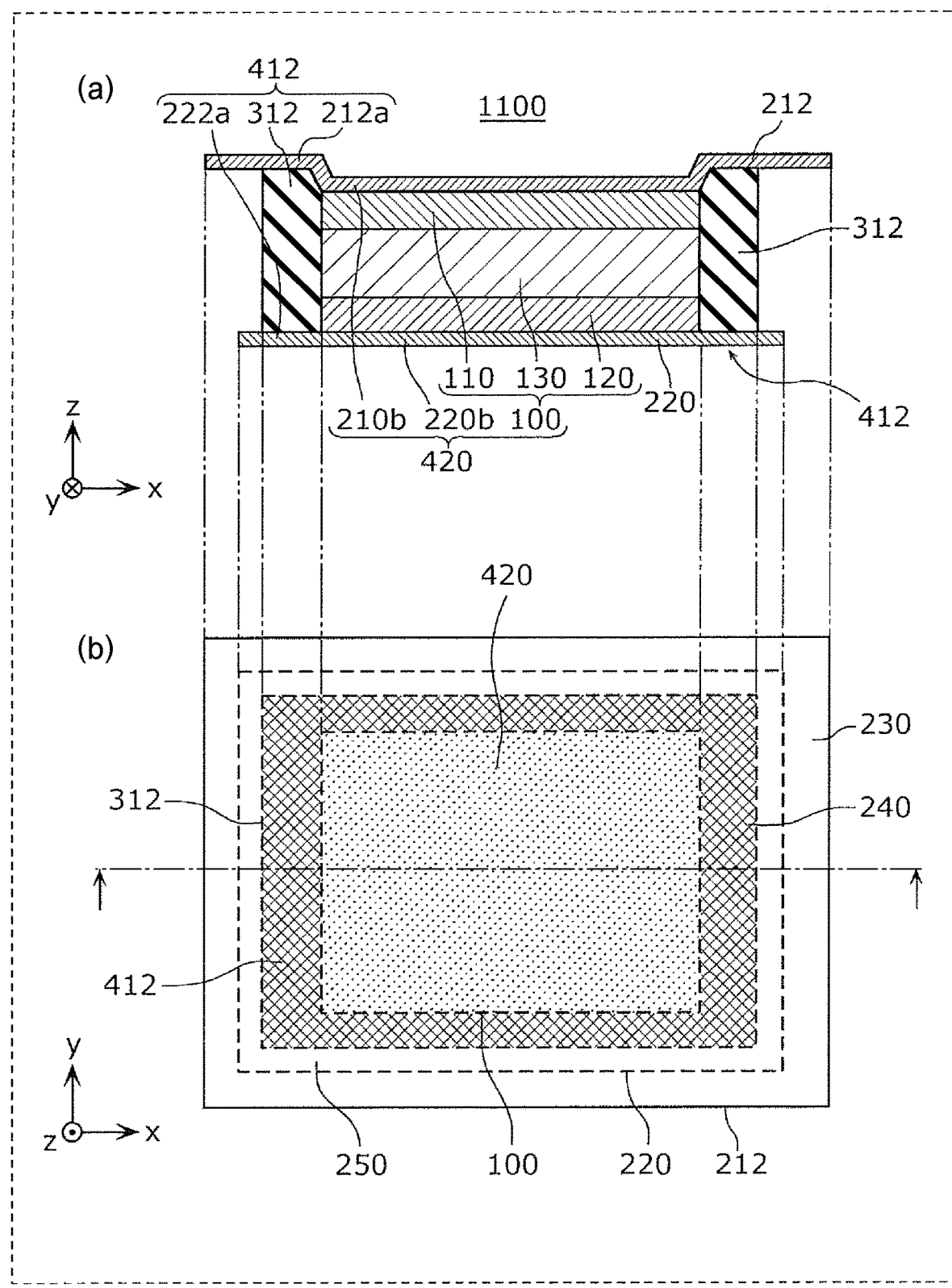
FIG. 2 shows a schematic structure of a battery in modification 1 of embodiment 1.

First, modification 1 of embodiment 1 will be described using FIG. 2. FIG. 2 shows a schematic structure of a battery 1100 in modification 1 of embodiment 1. Specifically, FIG. 2(a) is a cross-sectional view illustrating the schematic structure of the battery 1100 and shows a cross section at a position indicated by a dash-dot line in FIG. 2(b). FIG. 2(b) is a transparent top view of the schematic structure of the battery 1100.

In FIG. 2(b), the shapes of components of the battery 1100 in plan view when the battery 1100 is viewed from above are represented by solid or broken lines. To facilitate the understanding of the shapes of a first stack portion 412 and the second stack portion 420 of the battery 1100 in plan view, the first stack portion 412 and the second stack portion 420 are shaded.

As shown in FIG. 2, the battery 1100 includes a seal 312 and an electrode current collector 212 instead of the seal 310 and the electrode current collector 210 in the battery 1000 in embodiment 1. Moreover, the battery 1100 has the first stack portion 412 instead of the first stack portion 410 in the battery 1000.

The seal 312 is disposed so as to surround the electric power generating element 100. Specifically, in plan view, the seal 312 is disposed continuously over the entire circumference of the electric power generating element 100. The seal 312 seals the entire side surfaces of the electric power generating element 100. When, for example, the electric power generating element 100 has a rectangular shape in plan view, the seal 312 may be disposed in contact with all the sides of the electric power generating element 100. When the battery 1100 is view from one of its sides (in a direction orthogonal to the z axis), the electric power generating element 100 is fully covered with the seal 312 and is not exposed to the outside.

As shown in FIG. 2(b), the seal 312 has a rectangular ring shape with a prescribed width in plan view. In plan view, the width of the seal 312 is shorter than the width of the rectangular ring-shaped second region 240. In the present modification, the seal 312 has a uniform thickness. Specifically, the thickness of the seal 312 is larger than the thickness of the electric power generating element 100 over the entire circumference of the seal 312.

The electrode current collector 212 has a first plate portion 212a instead of the first plate portion 210a of the electrode current collector 210 in embodiment 1. The first plate portion 212a is disposed so as to surround the electric power generating element 100 in plan view, as is the seal 312. Specifically, the shape of the first plate portion 212a in plan view is the same as the shape of the seal 312 in plan view. The first plate portion 212a has a rectangular ring shape that surrounds the second plate portion 210b located at the center.

The first stack portion 412 includes the seal 312, the first plate portion 212a of the electrode current collector 212, and a first plate portion 222a of the counter electrode current collector 220. The first plate portion 222a is a part of the counter electrode current collector 220 and overlaps the seal 312 in plan view, and the shape of the first plate portion 222a in plan view is the same as the shape of the first plate portion 212a in plan view.

In plan view, the first stack portion 412 surrounds the second stack portion 420. The first stack portion 412 is disposed continuously over the entire circumference of the second stack portion 420. Since the first stack portion 412 includes the seal 312 thicker than the electric power generating element 100, the thickness T1 of the first stack portion 412 is larger than the thickness T2 of the second stack portion 420.

In the structure described above, the seal 312 can maintain the distance between the electrode current collector 212 and the counter electrode current collector 220 at at least a certain distance (e.g., at least the thickness of the seal 312) over the entire circumference of the electric power generating element 100. Therefore, the electrode current collector 212 and the counter electrode current collector 220 are prevented from coming close to each other over the entire circumference of the electric power generating element 100.

Even when one of the electrode current collector 212 and the counter electrode current collector 220 is deformed (e.g., bent or has burrs) around the electric power generating element 100, the seal 312 can prevent the deformed portion from coming into contact with the other one of the electrode current collector 212 and the counter electrode current collector 220. The risk of a short circuit between the electrode layer 110 and the counter electrode layer 120 can thereby be further reduced.

In the structure described above, the side surfaces of the electric power generating element 100 can be covered with the seal 312. In this case, even when, for example, the electrode material contained in the electrode layer 110, the counter electrode material contained in the counter electrode layer 120, or the solid electrolyte material contained in the electrolyte layer 130 partially collapses, the seal 312 can prevent the collapsed component from coming into contact with another component in the battery. Therefore, a short circuit inside the battery caused by the collapse of a component of the battery 1100 can be prevented. The reliability of the battery 1100 can thereby be more improved.

<Modification 2>

Figure 3:
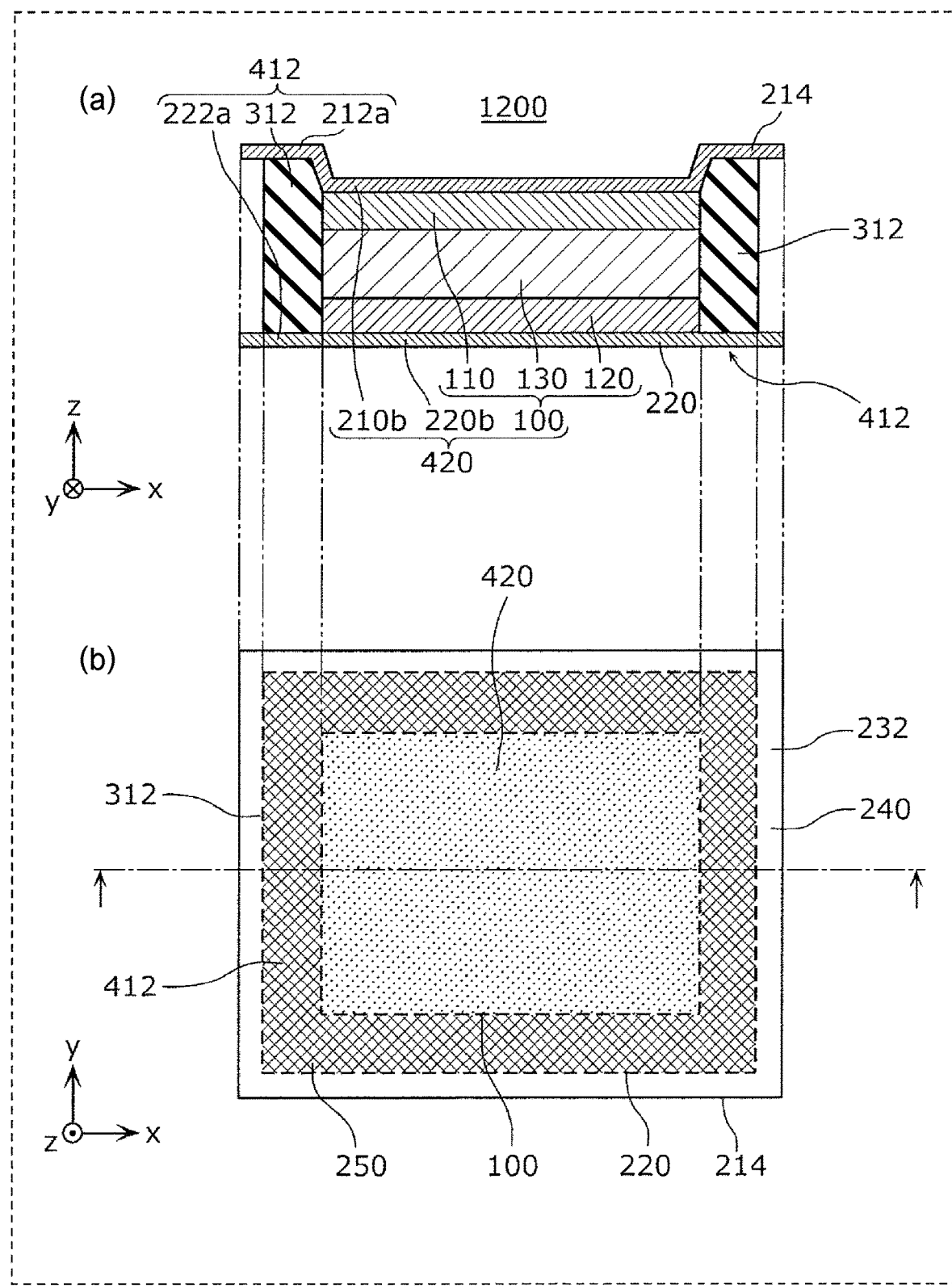
FIG. 3 shows a schematic structure of a battery in modification 2 of embodiment 1.

Next, modification 2 of embodiment 1 will be described using FIG. 3. FIG. 3 shows a schematic structure of a battery 1200 in modification 2 of embodiment 1. Specifically, FIG. 3(a) is a cross-sectional view illustrating the schematic structure of the battery 1200 and shows a cross section at a position indicated by a dash-dot line in FIG. 3(b). FIG. 3(b) is a transparent top view showing the schematic structure of the battery 1200.

In FIG. 3(b), the shapes of components of the battery 1200 in plan view when the battery 1200 is viewed from above are represented by solid or broken lines. To facilitate the understanding of the shapes of a first stack portion 412 and the second stack portion 420 of the battery 1200 in plan view, the first stack portion 412 and the second stack portion 420 are shaded.

As shown in FIG. 3, the battery 1200 includes an electrode current collector 214 instead of the electrode current collector 212 of the battery 1100 in modification 1. The size of the electrode current collector 214 and its shape in plan view are the same as those of the counter electrode current collector 220.

Since the electrode current collector 214 and the counter electrode current collector 220 have the same size and the same shape as shown in FIG. 3(b), a first region 232 in which the electrode layer 110 is not disposed has the same size and the same shape as those of the second region 240 in which the counter electrode layer 120 is not disposed. The facing region 250 is the same as the region in which the electrode current collector 214 is formed and as the region in which the counter electrode current collector 220 is formed.

In the structure described above, since the electrode current collector 214 does not protrude outward from the counter electrode current collector 220, an impact that causes the electrode current collector 214 to be separated from the counter electrode current collector 220 is unlikely to be applied from the outside. Therefore, separation of the electrode current collector 214 can be prevented, and breakage of the battery 1200 can thereby be prevented.

<Modification 3>

Figure 4:
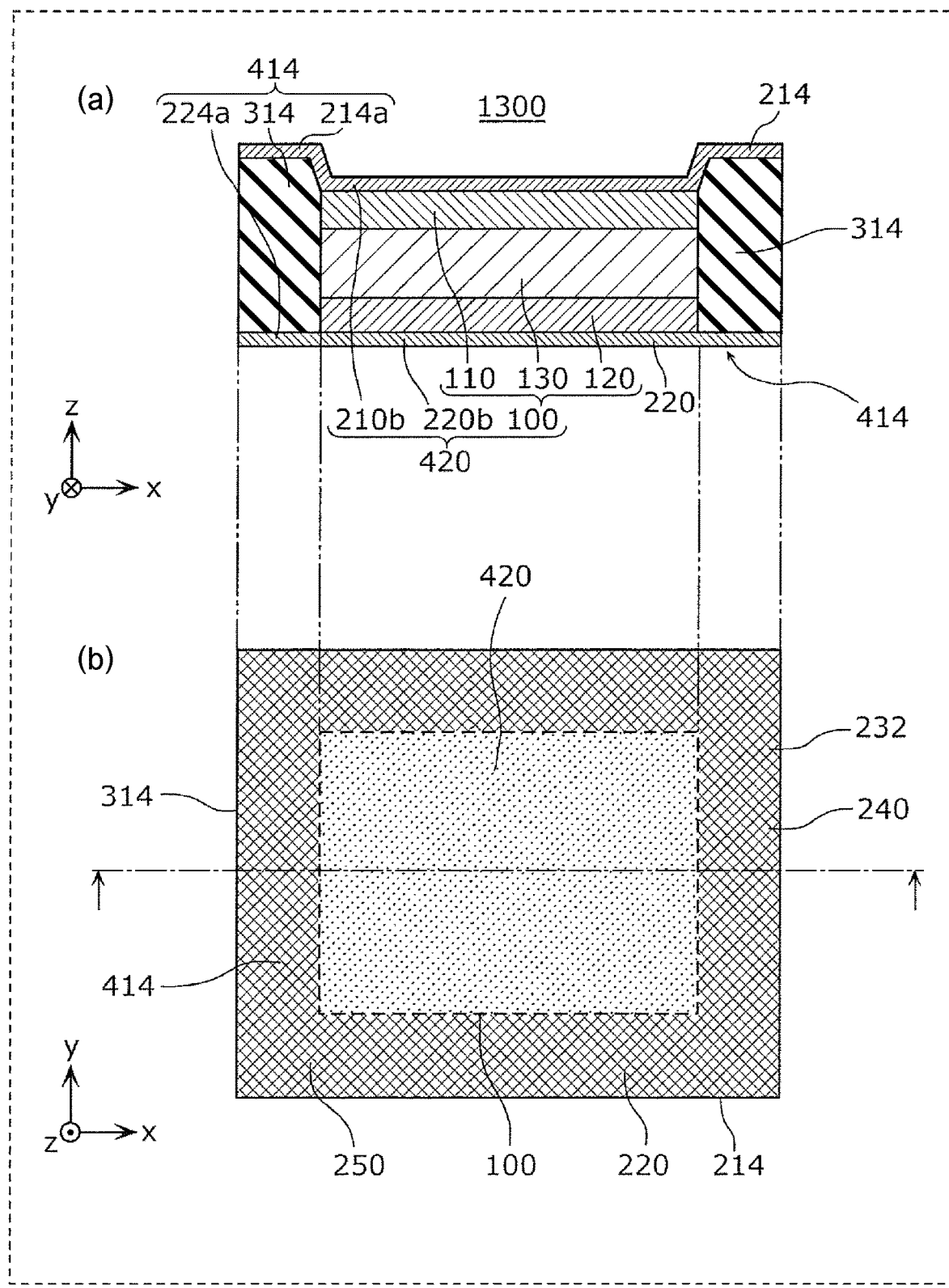
FIG. 4 shows a schematic structure of a battery in modification 3 of embodiment 1.

Next, modification 3 of embodiment 1 will be described using FIG. 4. FIG. 4 shows a schematic structure of a battery 1300 in modification 3 of embodiment 1. Specifically, FIG. 4(a) is a cross-sectional view illustrating the schematic structure of the battery 1300 and shows a cross section at a position indicated by a dash-dot line in FIG. 4(b). FIG. 4(b) is a transparent top view showing the schematic structure of the battery 1300.

In FIG. 4(b), the shapes of components of the battery 1300 in plan view when the battery 1300 is viewed from above are represented by solid or broken lines. To facilitate the understanding of the shapes of a first stack portion 414 and the second stack portion 420 of the battery 1300 in plan view, the first stack portion 414 and the second stack portion 420 are shaded.

As shown in FIG. 4, the battery 1300 includes a seal 314 instead of the seal 312 of the battery 1200 in modification 2. Moreover, the battery 1300 has a first stack portion 414 instead of the first stack portion 412 of the battery 1200.

The seal 314 is disposed so as to fill the gap between the electrode current collector 214 and the counter electrode current collector 220. As shown in FIG. 4(b), the shape of the seal 314 in plan view is the same as the shapes of the first region 232 and the second region 240 in plan view. Specifically, the seal 314 is disposed over the entire first region 232 and over the entire second region 240. As shown in FIG. 4(a), outer circumferential side surfaces (e.g., the yz surfaces) of the seal 314 are flush with edge surfaces (the yz surfaces) of the electrode current collector 214 and edge surfaces (the yz surfaces) of the counter electrode current collector 220.

In the present modification, the seal 314 has a uniform thickness. Specifically, the thickness of the seal 314 is larger than the thickness of the electric power generating element 100 over the entire circumference of the seal 314.

The first stack portion 414 includes the seal 314, a first plate portion 214a of the electrode current collector 214, and a first plate portion 224a of the counter electrode current collector 220. The first plate portion 214a is a part of the electrode current collector 214 and overlaps the seal 314 in plan view. The shape of the first plate portion 214a in plan view and its size are the same as those of the first region 232. The first plate portion 224a is a part of the counter electrode current collector 220 and overlaps the seal 314 in plan view. The shape of the first plate portion 224a in plan view and its size are the same as those of the second region 240.

The first stack portion 414 is disposed so as to surround the second stack portion 420 in plan view. The first stack portion 414 is disposed continuously over the entire circumference of the second stack portion 420. The first stack portion 414 includes the seal 314, and the thickness T1 of the first stack portion 414 is larger than the thickness T2 of the second stack portion 420.

In the structure described above, since the gap between the outer circumference of the electrode current collector 214 and the outer circumference of the counter electrode current collector 220 is filled with the seal 314, an impact that causes one of the electrode current collector 214 and the counter electrode current collector 220 to be separated from the other is unlikely to be applied from the outside. Therefore, separation of the electrode current collector 214 and separation of the counter electrode current collector 220 can be prevented, and breakage of the battery 1300 can thereby be prevented.

<Modification 4>

Figure 5:
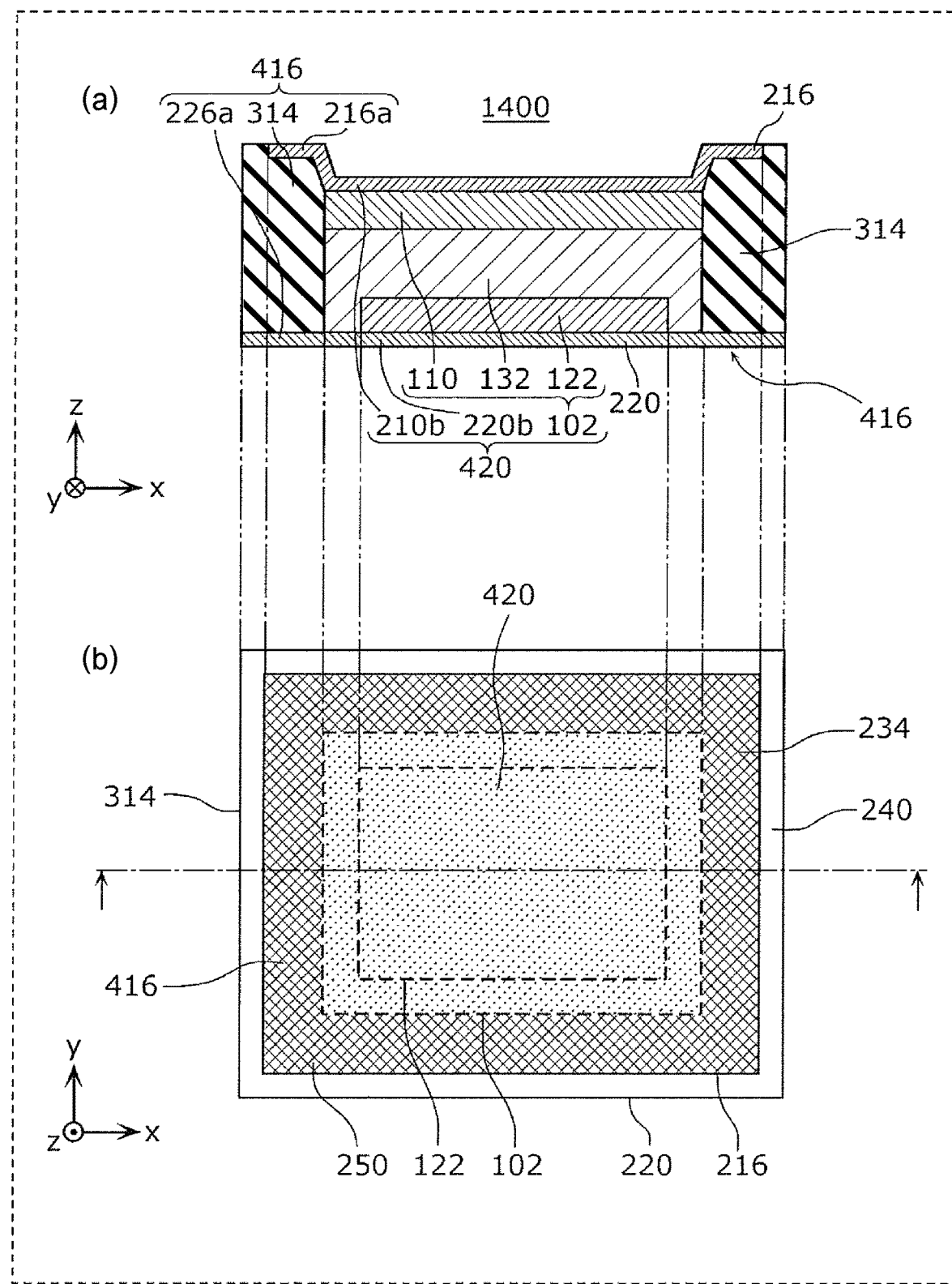
FIG. 5 shows a schematic structure of a battery in modification 4 of embodiment 1.

Next, modification 4 of embodiment 1 will be described using FIG. 5. FIG. 5 shows a schematic structure of a battery 1400 in modification 4 of embodiment 1. Specifically, FIG. 5(a) is a cross-sectional view illustrating the schematic structure of the battery 1400 and shows a cross section at a position indicated by a dash-dot line in FIG. 5(b). FIG. 5(b) is a transparent top view showing the schematic structure of the battery 1400.

In FIG. 5(b), the shapes of components of the battery 1400 in plan view when the battery 1400 is viewed from above are represented by solid or broken lines. To facilitate the understanding of the shapes of a first stack portion 416 and the second stack portion 420 of the battery 1400 in plan view, the first stack portion 416 and the second stack portion 420 are shaded. In the present modification, the second stack portion 420 includes an electric power generating element 102 instead of the electric power generating element 100.

As shown in FIG. 5, the battery 1400 includes the electric power generating element 102 and an electrode current collector 216 instead of the electric power generating element 100 and the electrode current collector 214 of the battery 1300 in modification 3. The electric power generating element 102 includes a counter electrode layer 122 and an electrolyte layer 132 instead of the counter electrode layer 120 and the electrolyte layer 130. The battery 1400 has the first stack portion 416 instead of the first stack portion 414 of the battery 1300.

In modification 4, the size of the electrode layer 110 differs from the size of the counter electrode layer 122. For example, in plan view, the electrode layer 110 is larger than the counter electrode layer 122. As shown in FIG. 5(b), the counter electrode layer 122 is located inside the electrode layer 110 in plan view.

As shown in FIG. 5(a), the electrolyte layer 132 covers the side surfaces of the counter electrode layer 122. In this case, the electrolyte layer 132 is in contact with the counter electrode current collector 220. The seal 314 is in contact with the side surfaces of the electrode layer 110 and with the side surfaces of the electrolyte layer 132 and is not in contact with the counter electrode layer 122.

In plan view, the electrode current collector 216 is smaller than the counter electrode current collector 220. Specifically, in plan view, the electrode current collector 216 is located inside the counter electrode current collector 220. Therefore, the facing region 250 is composed of a first region 234 and a region inside the first region 234. The first region 234 includes at least part of the outer circumference of the electrode current collector 216 and does not overlap the electrode layer 110.

In the example shown in the present modification, the counter electrode layer 122 is smaller than the electrode layer 110, but the electrode layer 110 may be smaller than the counter electrode layer 122. In this case, the electrolyte layer 132 may cover the side surfaces of the electrode layer 110. The seal 314 may be in contact with the side surfaces of the counter electrode layer 122 and with the side surfaces of the electrolyte layer 132 and may not be in contact with the electrode layer 110.

For example, one of the counter electrode layer 122 and the electrode layer 110 that corresponds to the positive electrode may be smaller than the other one corresponding to the negative electrode. Specifically, the negative electrode active material layer may be larger than the positive electrode active material layer. In this case, a reduction in the reliability of the battery caused by precipitation of lithium or magnesium can be prevented.

The first stack portion 416 includes the seal 314, a first plate portion 216a of the electrode current collector 216, and a first plate portion 226a of the counter electrode current collector 220. The first plate portion 216a is a part of the electrode current collector 216 and overlaps the seal 314 in plan view. The first plate portion 226a is a part of the counter electrode current collector 220 and overlaps the seal 314 in plan view. The shape of the first plate portion 226a in plan view and its size are the same as those of the first plate portion 216a.

The first stack portion 416 is disposed so as to surround the second stack portion 420 in pan view. The first stack portion 416 is disposed continuously over the entire circumference of the second stack portion 420. The first stack portion 416 includes the seal 314, and the thickness T1 of the first stack portion 416 is larger than the thickness T2 of the second stack portion 420.

In the present modification, a part of the seal 314 covers the side surfaces of the electrode current collector 216. Specifically, a portion of the seal 314 that is not covered with the electrode current collector 216 is flush with the upper surface of the electrode current collector 216. A part of the seal 314 may not cover the side surfaces of the electrode current collector 216. For example, a portion of the seal 314 that is not covered with the electrode current collector 216 may be flush with the lower surface of the electrode current collector 216.

<Modification 5>

Figure 6:
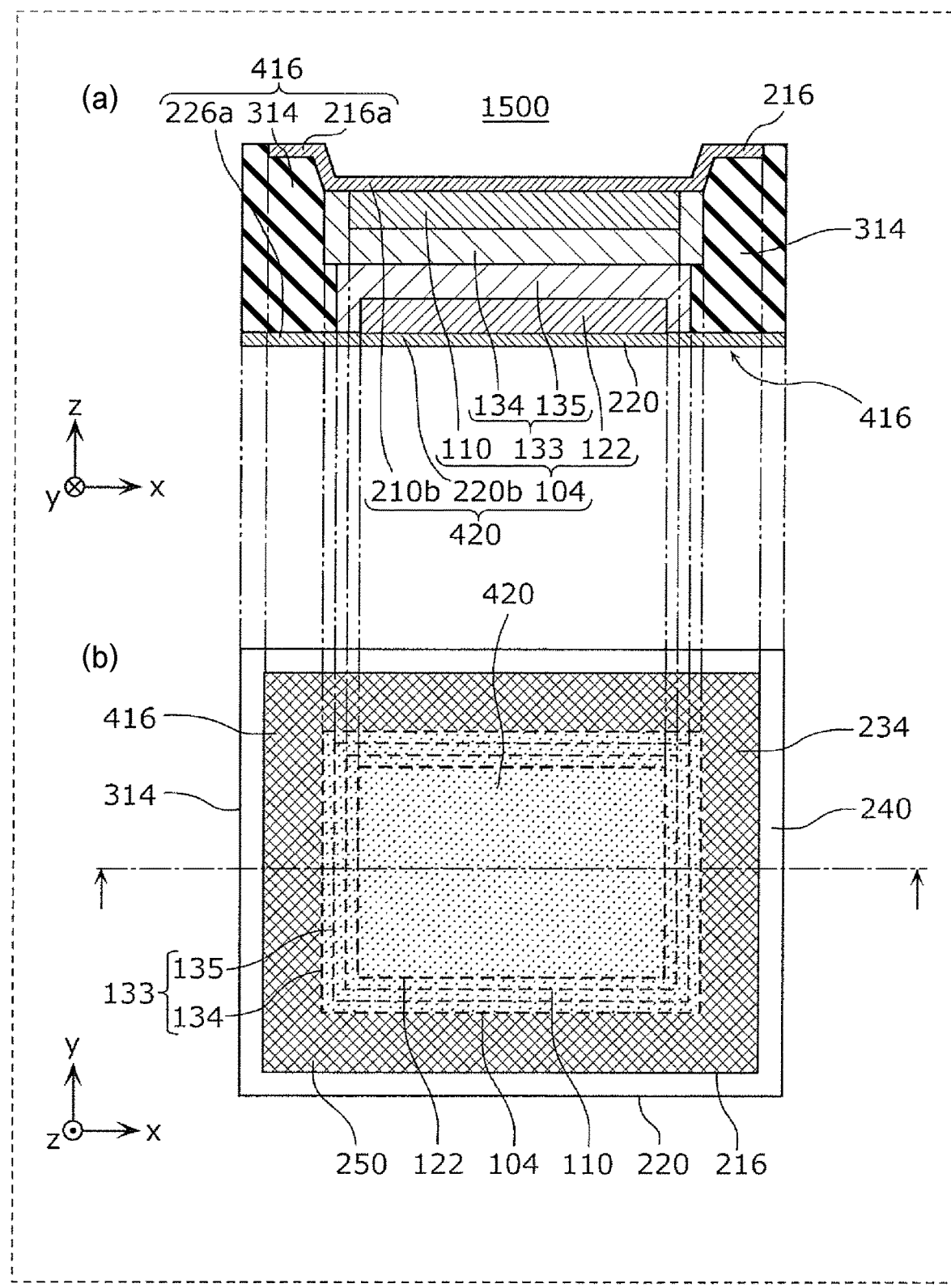
FIG. 6 shows a schematic structure of a battery in modification 5 of embodiment 1.

Next, modification 5 of embodiment 1 will be described using FIG. 6. FIG. 6 shows a schematic structure of a battery 1500 in modification 5 of embodiment 1. Specifically, FIG. 6(a) is a cross-sectional view illustrating the schematic structure of the battery 1500 and shows a cross section at a position indicated by a dash-dot line in FIG. 6(b). FIG. 6(b) is a transparent top view showing the schematic structure of the battery 1500.

In FIG. 6(b), the shapes of components of the battery 1500 in plan view when the battery 1500 is viewed from above are represented by solid or broken lines. To facilitate the understanding of the shapes of the first stack portion 416 and the second stack portion 420 of the battery 1500 in plan view, the first stack portion 416 and the second stack portion 420 are shaded. In the present modification, the second stack portion 420 includes an electric power generating element 104 instead of the electric power generating element 100.

As shown in FIG. 6, the battery 1500 includes the electric power generating element 104 instead of the electric power generating element 102 of the battery 1400 in modification 4. The electric power generating element 104 includes an electrolyte layer 133 instead of the electrolyte layer 132 of the electric power generating element 102. The electrolyte layer 133 includes an electrode-side electrolyte layer 134 and a counter electrode-side electrolyte layer 135.

The electrode-side electrolyte layer 134 is located closer to the electrode layer 110 than the counter electrode-side electrolyte layer 135 and is in contact with the electrode layer 110. As shown in FIG. 6(a), the electrode-side electrolyte layer 134 covers, for example, the side surfaces of the electrode layer 110 and is in contact with the electrode current collector 216. The electrode layer 110 is covered with the electrode-side electrolyte layer 134 and is not exposed to the outside. Specifically, the electrode layer 110 is not in contact with the seal 314.

The counter electrode-side electrolyte layer 135 is located closer to the counter electrode layer 122 than the electrode-side electrolyte layer 134 and is in contact with the counter electrode layer 122. As shown in FIG. 6(a), the counter electrode-side electrolyte layer 135 covers, for example, the side surfaces of the counter electrode layer 122 and is in contact with the counter electrode current collector 220. The counter electrode layer 122 is covered with the counter electrode-side electrolyte layer 135 and is not exposed to the outside. Specifically, the counter electrode layer 122 is not in contact with the seal 314.

As shown in FIG. 6(b), in plan view, the electrode-side electrolyte layer 134 is larger than the counter electrode-side electrolyte layer 135. Specifically, in plan view, the counter electrode-side electrolyte layer 135 is located inside the electrode-side electrolyte layer 134. The size and shape of the electrode-side electrolyte layer 134 may be the same as those of the counter electrode-side electrolyte layer 135. For example, the side surfaces of the electrode-side electrolyte layer 134 may be flush with the side surfaces of the counter electrode-side electrolyte layer 135.

The electrode-side electrolyte layer 134 and the counter electrode-side electrolyte layer 135 each contain an electrolyte material. The electrolyte material used may be a well-known electrolyte for batteries. The electrolyte material may be a solid electrolyte. The electrode-side electrolyte layer 134 and the counter electrode-side electrolyte layer 135 may contain the same electrolyte material or may contain different electrolyte materials. The thickness of the electrode-side electrolyte layer 134 and the thickness of the counter electrode-side electrolyte layer 135 may each be from 5 μm to 150 μm inclusive and may each be from 5 μm to 50 μm inclusive.

The seal 314 is in contact with the side surfaces of the electrode-side electrolyte layer 134 and with the side surfaces of the counter electrode-side electrolyte layer 135. Alternatively, at least part of the side surfaces of the electrode-side electrolyte layer 134 and the side surfaces of the counter electrode-side electrolyte layer 135 may not be covered with the seal 314 and may be exposed to the outside.

In the structure described above, since the electrolyte layer 133 covers both the electrode layer 110 and the counter electrode layer 122, a reduction in the capacity of the battery caused by collapse or isolation of part of the electrode layer 110 or the counter electrode layer 122 can be prevented.

<Modification 6>

Figure 7:
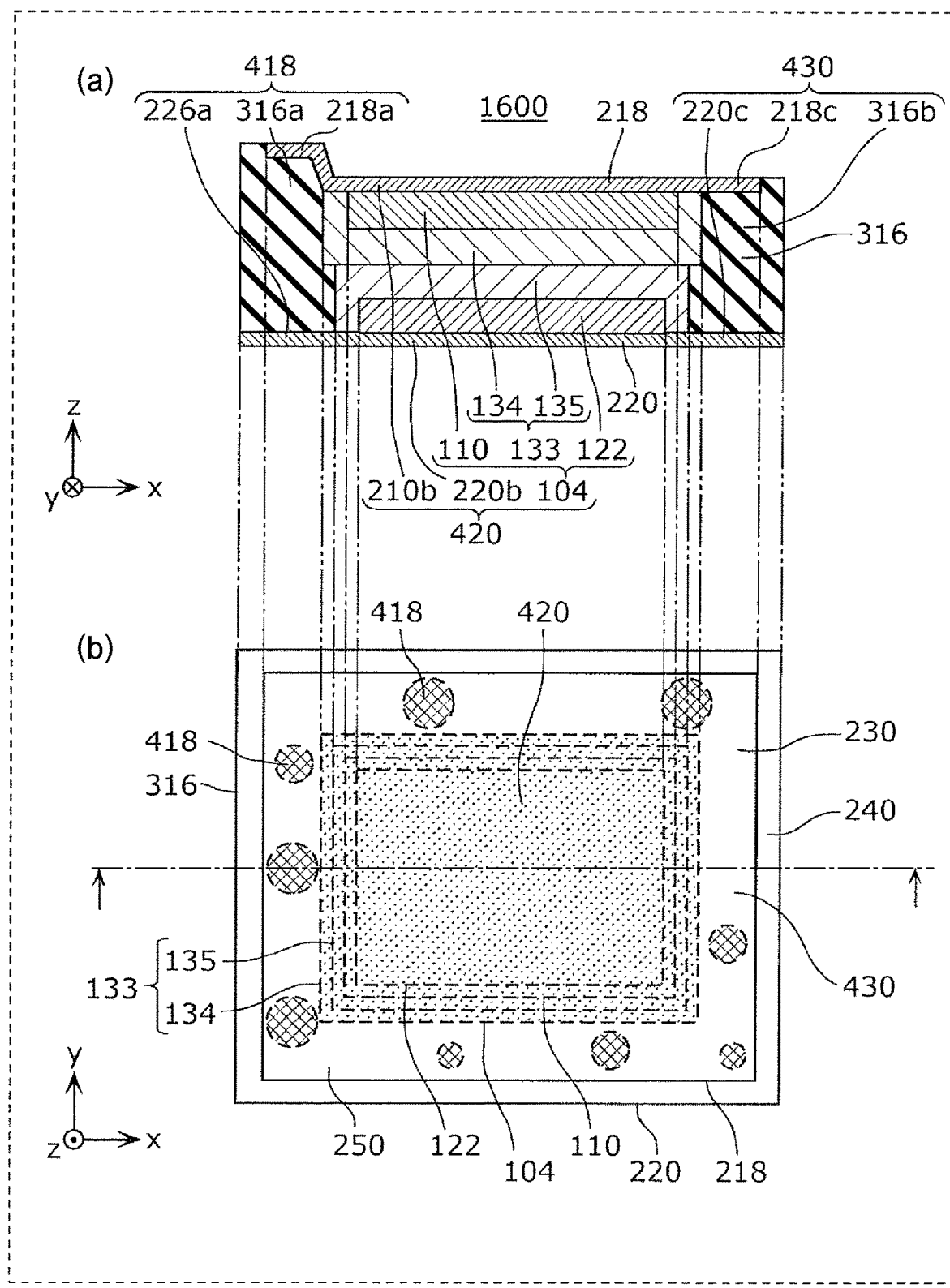
FIG. 7 shows a schematic structure of a battery in modification 6 of embodiment 1.

Next, modification 6 of embodiment 1 will be described using FIG. 7. FIG. 7 shows a schematic structure of a battery 1600 in modification 6 of embodiment 1. Specifically, FIG. 7(a) is a cross-sectional view illustrating the schematic structure of the battery 1600 and shows a cross section at a position indicated by a dash-dot line in FIG. 7(b). FIG. 7(b) is a transparent top view showing the schematic structure of the battery 1600.

In FIG. 7(b), the shapes of components of the battery 1600 in plan view when the battery 1600 is viewed from above are represented by solid or broken lines. To facilitate the understanding of the shapes of a plurality of first stack portions 418 and the second stack portion 420 of the battery 1600 in plan view, the first stack portions 418 and the second stack portion 420 are shaded.

As shown in FIG. 7, the battery 1600 includes a seal 316 and an electrode current collector 218 instead of the seal 314 and the electrode current collector 216 of the battery 1500 in modification 5. The battery 1600 has the plurality of first stack portions 418 instead of the first stack portion 416 of the battery 1500. The battery 1600 further has a third stack portion 430.

The seal 316 is disposed so as to surround the electric power generating element 104. Specifically, in plan view, the seal 316 is disposed continuously over the entire circumference of the electric power generating element 104.

In the present modification, the thickness of the seal 316 is not uniform. Specifically, as shown in FIG. 7(a), the seal 316 has a plurality of first sealing portions 316a and a second sealing portion 316b thinner than the first sealing portions 316a. The first sealing portions 316a are included in the respective first stack portions 418. The second sealing portion 316b is included in the third stack portion 430. As shown in FIG. 7(b), the plurality of first stack portions 418 are provided. Therefore, the seal 316 has the plurality of first sealing portions 316a.

The electrode current collector 218 has a plurality of first plate portions 218a, a second plate portion 210b, and a third plate portion 218c. The plurality of first plate portions 218a, the second plate portion 210b, and the third plate portion 218c are each a flat plate portion with a uniform thickness and are disposed parallel to the counter electrode current collector 220.

Each of the plurality of first plate portions 218a is located farther from the counter electrode current collector 220 than the second plate portion 210b and the third plate portion 218c in the direction of the thickness of the battery 1600. The first plate portions 218a are included in the respective first stack portions 418. The third plate portion 218c is located at the same position, with respect to the direction of the thickness of the battery 1600, as the second plate portion 210b. Specifically, the third plate portion 218c and the second plate portion 210b form one flat plate portion. The third plate portion 218c is included in the third stack portion 430.

Each of the plurality of first stack portions 418 includes a corresponding one of the first sealing portions 316a of the seal 316 and further includes a part of the electrode current collector 218 and a part of the counter electrode current collector 220 that overlap the corresponding first sealing portion 316a when the battery 1600 is viewed in the direction of its thickness (i.e., in plan view). Specifically, each first stack portion 418 includes a corresponding first sealing portion 316a, a corresponding first plate portion 218a of the electrode current collector 218, and a corresponding first plate portion 226a of the counter electrode current collector 220.

As shown in FIG. 7, the plurality of first stack portions 418 are located outside the electric power generating element 104 in plan view and disposed as isolated islands. Each of the plurality of first stack portions 418 has, for example, a circular shape in plan view but may have a polygonal shape such as a rectangular shape or a triangular shape. The shapes of the plurality of first stack portions 418 in plan view and their sizes may be different or the same.

The thickness T1 of each of the plurality of first stack portions 418 is larger than the thickness T2 of the second stack portion 420. The thicknesses T1 of the plurality of first stack portions 418 are the same but may differ from each other.

The third stack portion 430 includes the second sealing portion 316b of the seal 316 and further includes a part of the electrode current collector 218 and a part of the counter electrode current collector 220 that overlap the second sealing portion 316b when the battery 1600 is viewed in the direction of its thickness (i.e., in plan view). For example, the third stack portion 430 includes the second sealing portion 316b, the third plate portion 218c of the electrode current collector 218, and a third plate portion 220c of the counter electrode current collector 220. The third stack portion 430 is disposed in the facing region 250 and located in a region in which the electric power generating element 104 and the plurality of first stack portions 418 are not disposed.

Let the thickness of the third stack portion 430 be T3. Then T3=T2 holds. Specifically, the thickness T3 of the third stack portion 430 is equal to the thickness T2 of the second stack portion 420. T3 may be larger than T2 and may be smaller than T1. Alternatively, T3 may be smaller than T2.

As described above, the thickness T1 of each of the plurality of first stack portions 418 is larger than the thickness T2 of the second stack portion 420 and the thickness T3 of the third stack portion 430. Therefore, when an external force is applied to the battery 1600 in order to electrically connect the battery 1600 to another component in a reliable manner, each of the plurality of first stack portions 418 functions as a pressure-receiving member that receives the external force. Therefore, since the pressure is unlikely to act on the second stack portion 420 including the electric power generating element 104, breakage, for example, of the electric power generating element 104 can be prevented. Since the plurality of first stack portions 418 are distributed in a plane, the pressure can be received in a dispersed manner, so the breakage of the first stack portions 418 themselves can also be prevented.

Figure 8:
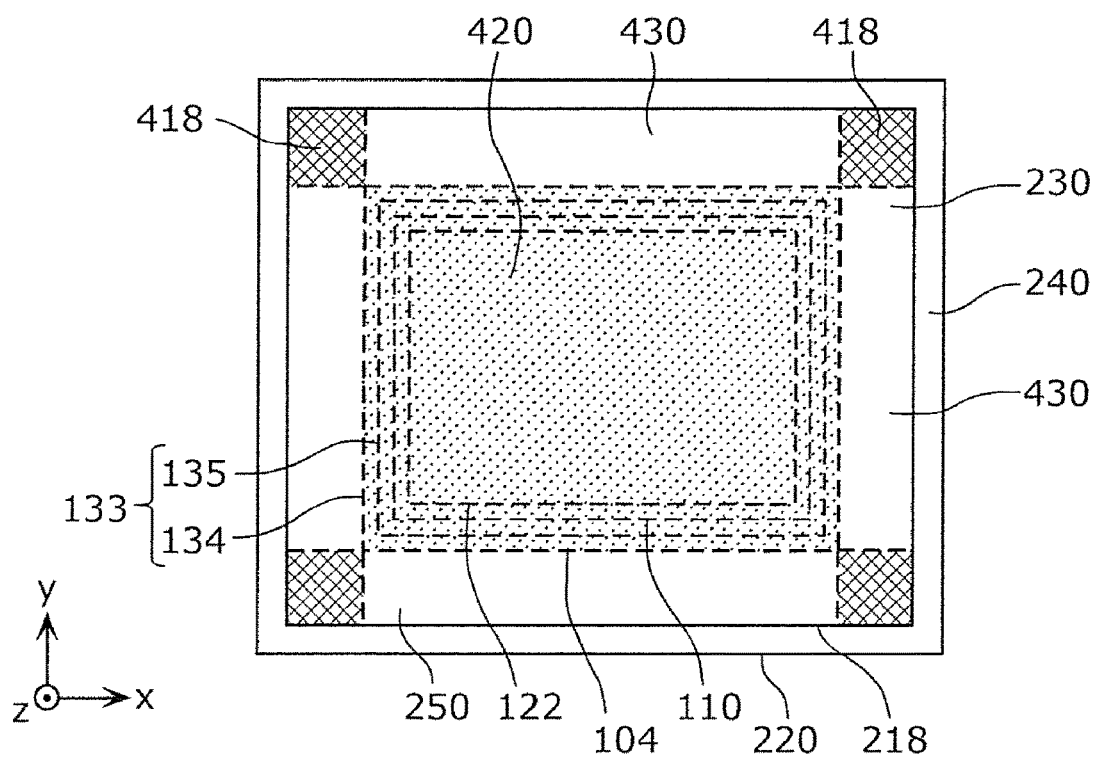
FIG. 8 is a transparent top view showing another example of the schematic structure of the battery in modification 6 of embodiment 1.

The shapes and arrangement of the plurality of first stack portions 418 are not limited to the example shown in FIG. 7(b). For example, a plurality of first stack portions 418 may be disposed such that the electric power generating element 104 is located inside a polygon with the plurality of first stack portions 418 as its vertices in plan view, as shown in FIG. 8. When, for example, the electric power generating element 104 has a rectangular shape in plan view, four first stack portions 418 may be located outside the four corners of the electric power generating element 104. Specifically, the four first stack portions 418 may be located at the four corners of the facing region 250. In the example shown in FIG. 8, the first stack portions 418 each have a square shape in plan view but may have, for example, a circular shape. In FIG. 8, third stack portions 430 are disposed between respective adjacent two of the four first stack portions 418 in plan view.

In the structure shown in FIG. 8, when an external force is applied in order to reliably connect the battery 1600 to another component, the external force can be received by the first stack portions 418 in a more reliable manner. Therefore, stress acting on the electric power generating element 104 can be reduced, and delamination and breakage of the electric power generating element 104 can be prevented more effectively.

Figure 9:
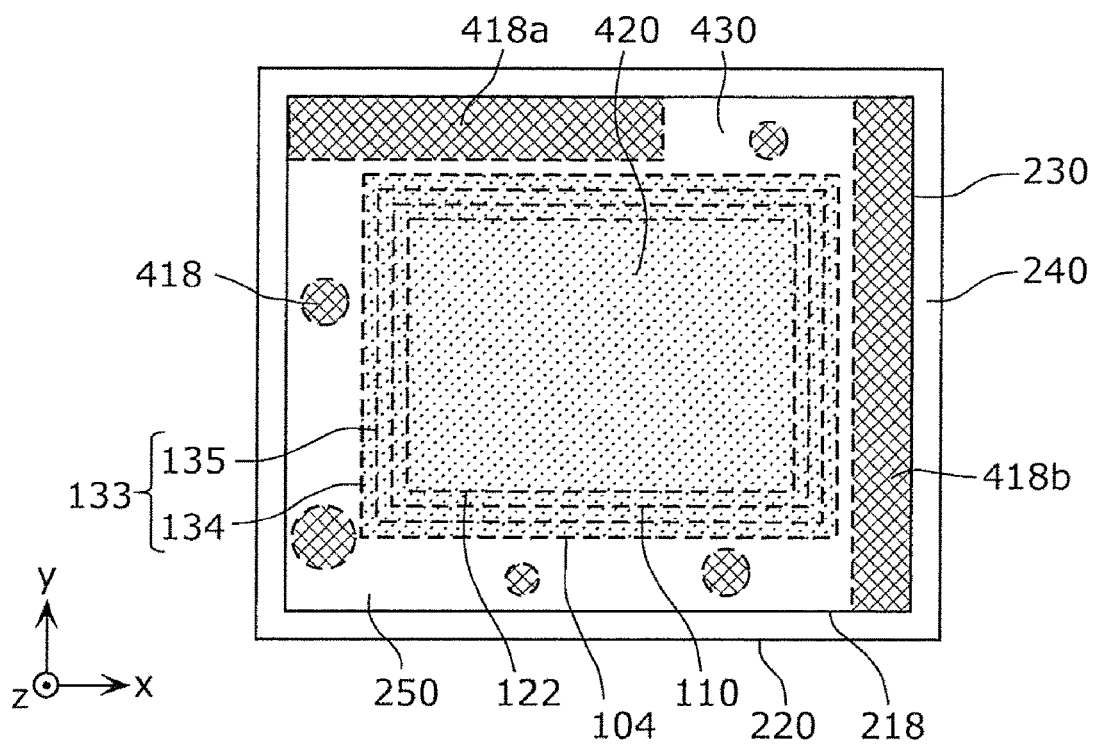
FIG. 9 is a transparent top view showing another example of the schematic structure of the battery in modification 6 of embodiment 1.

For example, at least one of the plurality of first stack portions 418 may be disposed outside the electric power generating element 104 so as to extend along the outer circumference of the electric power generating element 104, as shown in FIG. 9. In FIG. 9, the third stack portion 430 is disposed in the facing region 250 and located in a region in which the electric power generating element 104 and the plurality of first stack portions 418 are not disposed.

FIG. 9 shows the plurality of first stack portions 418 including first stack portions 418a and 418b. The first stack portions 418a and 418b extend along their respective sides of the rectangular electric power generating element 104. Specifically, the first stack portion 418a extends from one of the four corners of the facing region 250 toward another along one side of the electric power generating element 104 (in the x axis direction). The first stack portion 418b extends from one of the four corners of the facing region 250 to another along one side of the electric power generating element 104 (in the y axis direction).

Figure 10:
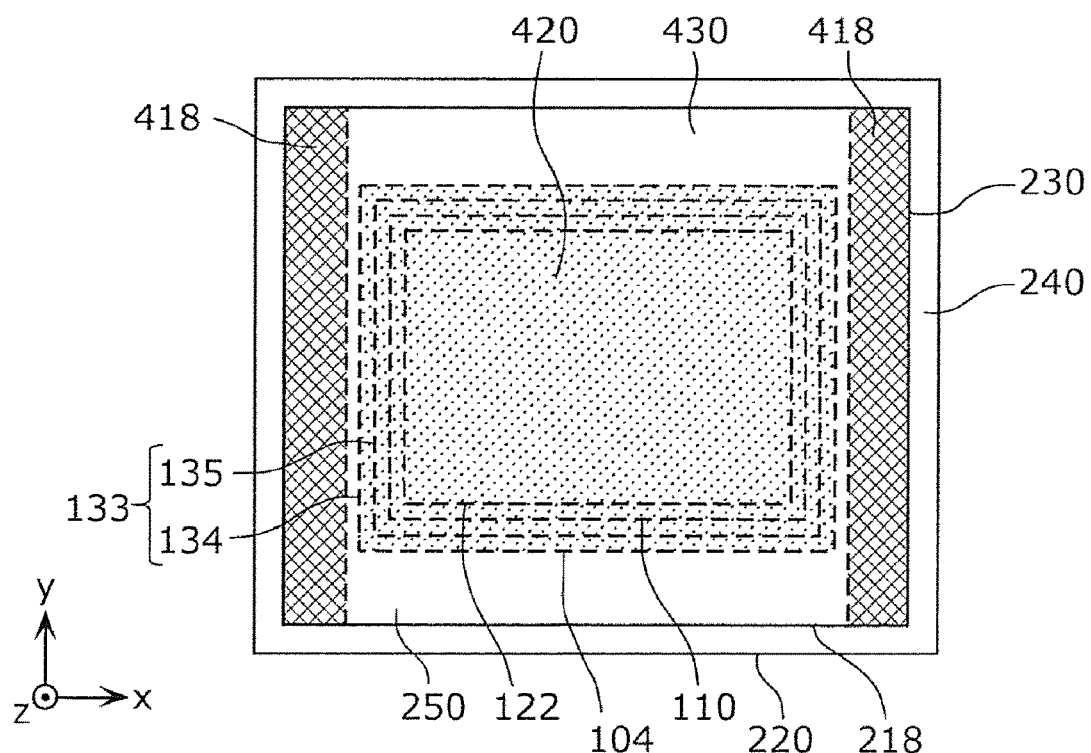
FIG. 10 is a transparent top view showing another example of the schematic structure of the battery in modification 6 of embodiment 1.

For example, at least two of the plurality of first stack portions 418 may be disposed along opposite sides of the rectangular electric power generating element 104, as shown in FIG. 10. In the example shown in FIG. 10, two first stack portions 418 extend from respective ones of the four corners of the facing region 250 to respective other ones of the four corners, and their lengths are the same. One of the two first stack portions 418 may be shorter than the other. In FIG. 10, the third stack portion 430 is disposed in the facing region 250 and located in a region in which the electric power generating element 104 and the plurality of first stack portions 418 are not disposed. The third stack portion 430 may be disposed along opposite sides of the rectangular electric power generating element 104.

Figure 11:
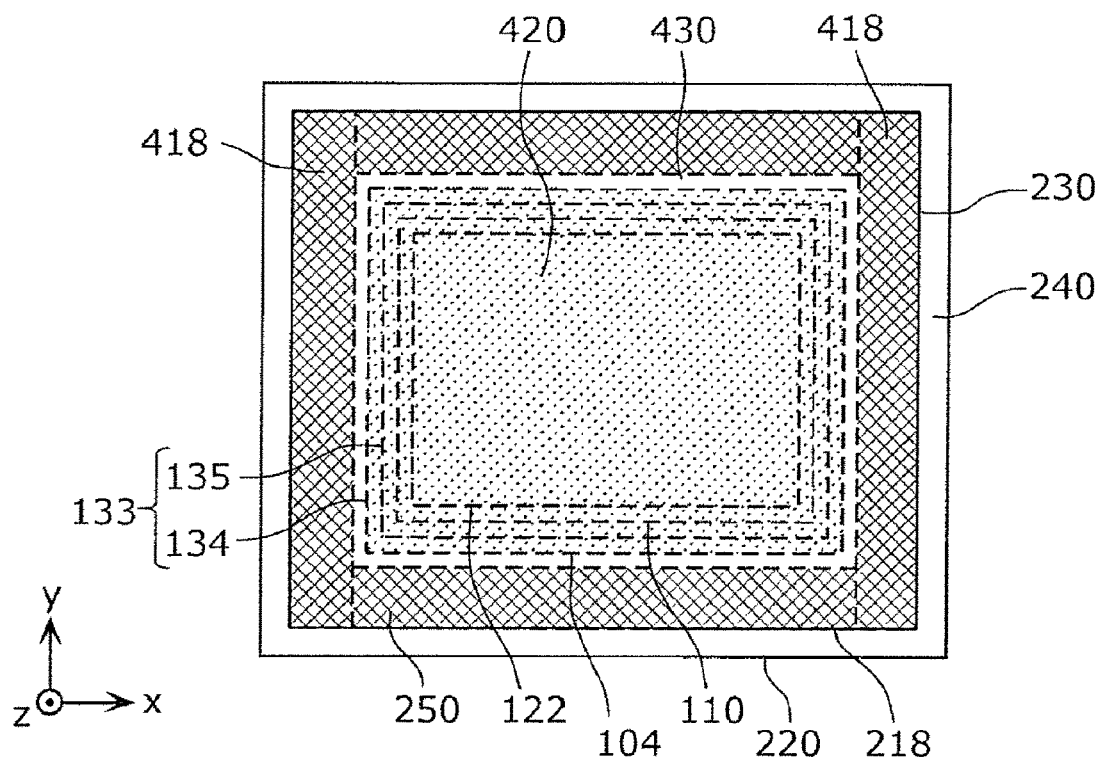
FIG. 11 is a transparent top view showing another example of the schematic structure of the battery in modification 6 of embodiment 1.

For example, the plurality of first stack portions 418 may be disposed continuously over the entire circumference of the electric power generating element 100, as shown in FIG. 11. In the example shown in FIG. 11, four first stack portions 418 are disposed along the sides of the rectangular electric power generating element 104. However, one rectangular ring-shaped first stack portion 418 may be disposed over the entire circumference of the electric power generating element 104.

In FIG. 11, the third stack portion 430 is disposed in the facing region 250 and located in a region in which the electric power generating element 104 and the plurality of first stack portions 418 are not disposed. Specifically, the third stack portion 430 is located between the electric power generating element 104 and the first stack portions 418 in plan view. In the battery shown in FIG. 11, the first stack portions 418 are not in contact with the electric power generating element 104, but the third stack portion 430 is in contact with the electric power generating element 104.

In the structure described above, when an external force is applied to the battery 1600 in order to reliably connect the battery 1600 in an electric circuit to another component, the external force is received mainly by the plurality of first stack portions 418. Therefore, stress acting on the electric power generating element 104 can be reduced sufficiently, and delamination and breakage of the electric power generating element 104 can be prevented more effectively.

<Modification 7>

Figure 12:
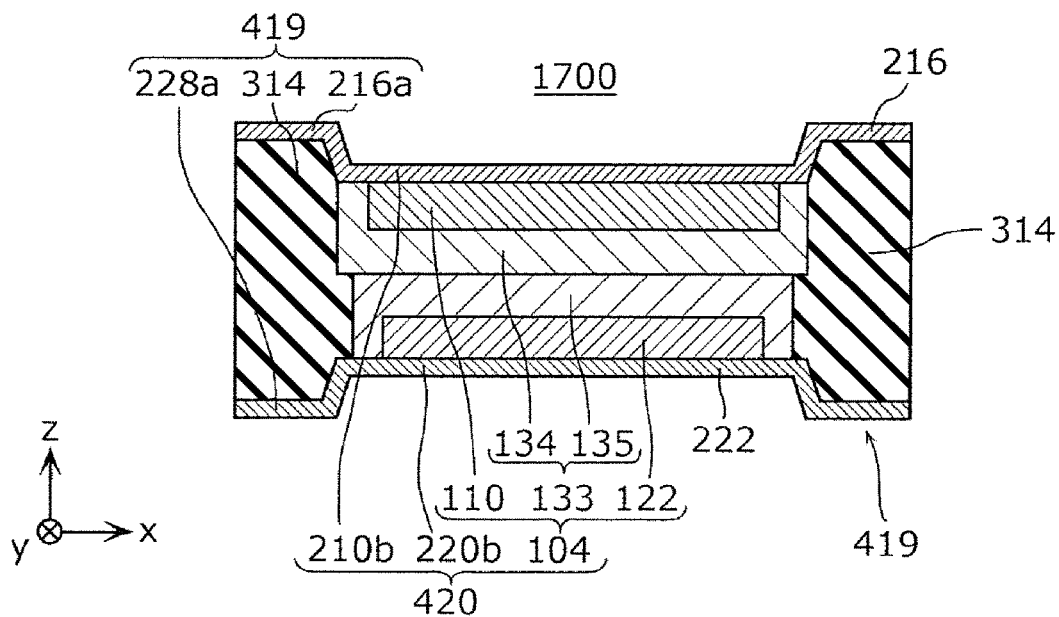
FIG. 12 shows a schematic structure of a battery in modification 7 of embodiment 1.

Next, modification 7 of embodiment 1 will be described using FIG. 12. FIG. 12 is a cross-sectional view showing a schematic structure of a battery 1700 in modification 7 of embodiment 1.

As shown in FIG. 12, the battery 1700 includes a counter electrode current collector 222 instead of the counter electrode current collector 220 of the battery 1500 in modification 5. The battery 1700 has a first stack portion 419 instead of the first stack portion 416.

The counter electrode current collector 222 has a first plate portion 228a instead of the first plate portion 226a of the counter electrode current collector 220 in modification 5. The first plate portion 228a is a flat plate portion with a uniform thickness. The first plate portion 228a is a part of the counter electrode current collector 222 and overlaps the seal 314 in plan view. The first plate portion 228a is included in the first stack portion 419 of the battery 1700.

The first plate portion 228a and the second plate portion 220b are located at different positions in the direction of the thickness of the battery 1700. Specifically, the first plate portion 228a is located farther from the electrode current collector 216 than the second plate portion 220b in the thickness direction. The connection portion between the first plate portion 228a and the second plate portion 220b may be orthogonal to the first plate portion 228a and the second plate portion 220b or may obliquely intersect them.

As shown in FIG. 12, the first stack portion 419 includes the seal 314, the first plate portion 216a of the electrode current collector 216, and the first plate portion 228a of the counter electrode current collector 222. The first stack portion 419 protrudes from the second stack portion 420 toward opposite sides in the direction of the thickness of the battery 1700. The protruding amount of the first stack portion 419 in the positive z axis direction and its protruding amount in the negative z axis direction may be the same or different.

In the structure described above, when an external force is applied to the battery 1700 in order to reliably connect the battery 1700 in an electric circuit to another component, the external force is received mainly by the first stack portion 419. Therefore, stress acting on the electric power generating element 104 can be reduced sufficiently, and delamination and breakage of the electric power generating element 104 can be prevented more effectively.

<Modification 8>

Figure 13:
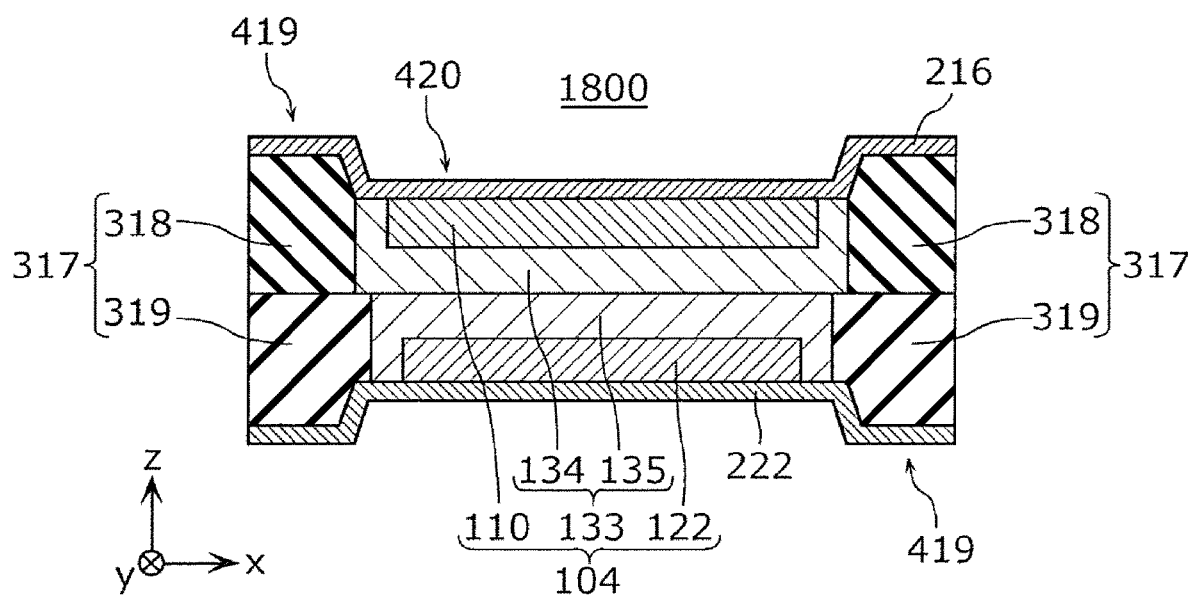
FIG. 13 shows a schematic structure of a battery in modification 8 of embodiment 1.

Next, modification 8 of embodiment 1 will be described using FIG. 13. FIG. 13 is a cross-sectional view showing a schematic structure of a battery 1800 in modification 8 of embodiment 1.

As shown in FIG. 13, the battery 1800 includes a seal 317 instead of the seal 314 of the battery 1700 in modification 7. The seal 317 includes a first seal 318 and a second seal 319. The first seal 318 is located closer to the electrode current collector 216 and contains a first material. The second seal 319 is located closer to the counter electrode current collector 222 than the first seal 318 and contains a second material. The second material differs from the first material. The second material is, for example, an insulating material having no ion conductivity. The second material may contain a resin such as a sealing agent.

The second material may be, for example, a material selected from a plurality of materials usable as the first material and may differ from the material contained in the first seal 318. For example, the second material may be a material not contained in the first seal 318 and may be selected from epoxy resins, acrylic resins, polyimide resins, and silsesquioxanes. The second material may contain a particulate metal oxide material.

In the structure described above, the most suitable material for the positive electrode-side seal and the most suitable material for the negative electrode-side seal can be selected from the viewpoint of reactivity and mechanical properties. The reliability of the battery 1800 can thereby be further improved.

[Method for Producing Battery]

Next, an example of a method for producing the battery in each of embodiment 1 and the modifications will be described. The method for producing the battery 1500 in modification 5 described above will be described using FIG. 14. The same applies to the batteries 1000, 1100, 1200, 1300, 1400, 1600, 1700, and 1800.

Figure 14:
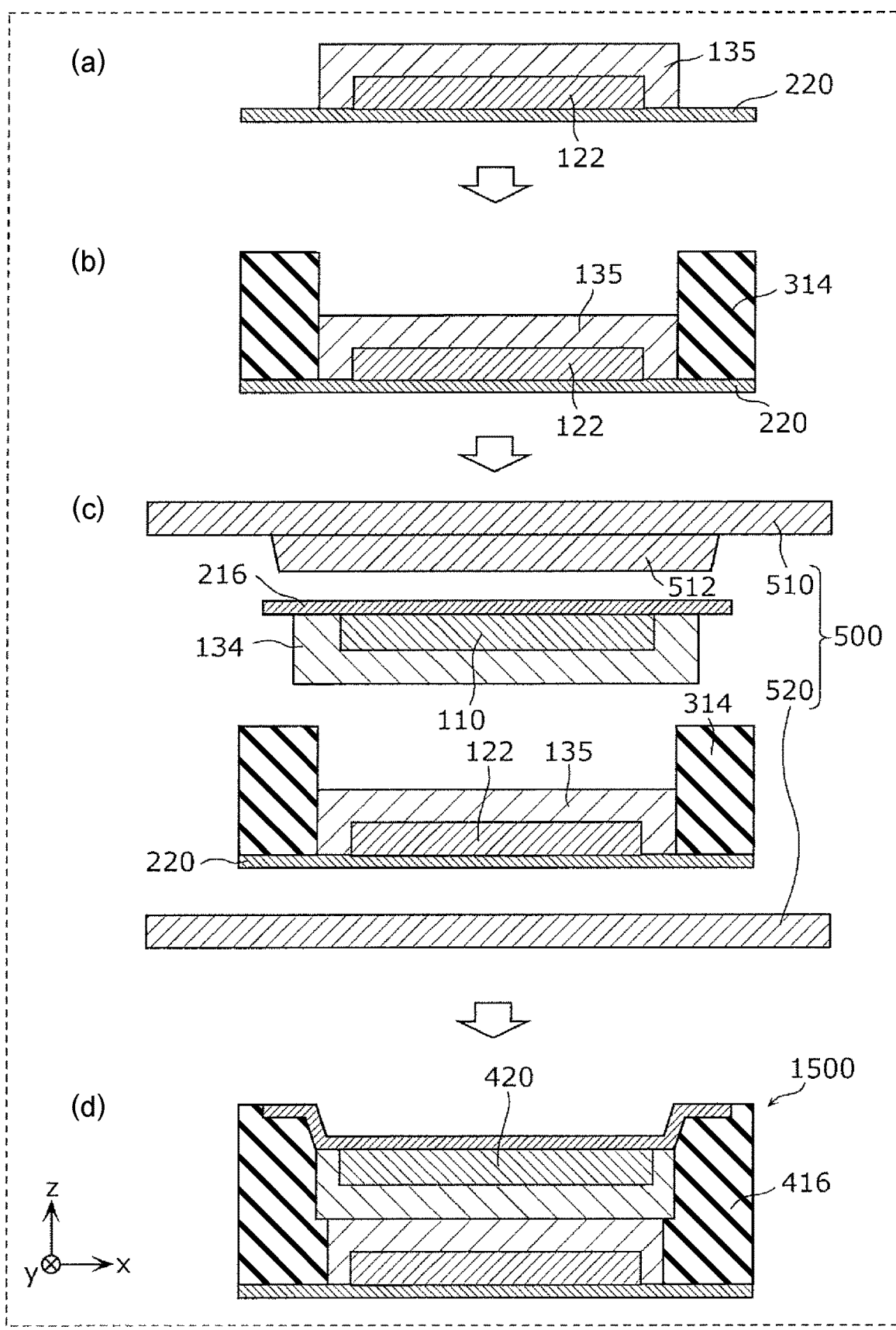
FIG. 14 shows an example of a method for producing the battery in embodiment 1.

FIG. 14 shows an example of the method for producing the battery 1500.

First, a paste-like coating is prepared by mixing a counter electrode material with a solvent. The coating is applied to the counter electrode current collector 220. Specifically, the counter electrode layer 122 is formed. Then a solid electrolyte material is applied to the counter electrode current collector 220 so as to cover the applied coating and is dried. Specifically, the counter electrode-side electrolyte layer 135 is formed. A counter electrode plate shown in FIG. 14(*a*) is thereby produced. The counter electrode material (and an electrode material described later) and solid electrolyte material prepared may be materials containing no solvent.

Next, as shown in FIG. 14(*b*), a sealing material is applied to a region surrounding the counter electrode plate. Specifically, the seal 314 is formed. In this case, as shown in FIG. 14(*b*), the sealing material may be applied such that the thickness of the seal 314 is larger than the total thickness of the counter electrode layer 122, the counter electrode-side electrolyte layer 135, the electrode layer 110, and the electrode-side electrolyte layer 134.

After the application of the sealing material, the applied coating is subjected to heat treatment or irradiated with UV rays. This allows the coating to be increased in viscosity while its flowability is maintained, and the coating is thereby pre-cured. The use of the pre-cured coating with increased viscosity allows the deformation of the seal 314 to be controlled.

Next, a paste-like coating is prepared by mixing the electrode material with a solvent. The coating is applied to the electrode current collector 216. Specifically, the electrode layer 110 is formed. Then a solid electrolyte material is applied to the electrode current collector 216 so as to cover the applied coating and is dried. Specifically, the electrode-side electrolyte layer 134 is formed. An electrode plate shown in FIG. 14(*c*) is thereby produced. The electrode current collector 216 at the time of application to the coating may be a flat plate as shown in FIG. 14(*c*). Specifically, the flat plate has no step in the thickness direction between the first plate portion 216*a* and the second plate portion 210*b*.

Next, as shown in FIG. 14(*c*), a pressurizing jig 500 including an upper jig 510 and a lower jig 520 is used to compression-bond the electrode plate to the counter electrode plate. Specifically, the electrode plate is placed so as to face the counter electrode plate having the seal 314 formed thereon, and the electrode plate and the counter electrode plate are held between the upper jig 510 and the lower jig 520 and compression-bonded.

In this case, the shape, arrangement, and protruding height of the first stack portion 416 (i.e., the shape of the electrode current collector 216) can be controlled by, for example, the shape, position and height of a projection 512 provided in the upper jig 510. For example, in FIG. 14(*c*), the projection 512 having a truncated quadrangular pyramid shape and substantially facing the electric power generating element 104 is provided in the upper jig 510 on its surface facing the lower jig 520. Therefore, as shown in FIG. 14(*d*), the first stack portion 416 having a step with a height approximately the same as the height of the projection 512 is formed in the pressurized battery 1500 in a region outside the electric power generating element 104.

For example, the seal 314 may be completely cured by heat treatment or irradiation with UV rays. The sealing state can thereby be more strengthened.

The sealing material may be applied to both the electrode plate and the counter electrode plate. Specifically, a part of the seal 314 is formed on the electrode plate, and another part of the seal 314 is formed on the counter electrode plate. Then the electrode plate and the counter electrode plate are laminated. In this case, since the amount of the seal 314 formed at one time is reduced, the seal 314 can be formed faster. Since the area of joining increases, the joint between the seal 314 and the electrode plate can be strengthened. Since the projection height of the seal 314 is reduced, the electrode plate or the counter electrode plate can be easily wound in the course of this step. Moreover, different sealing materials most suitable for the electrode plate and the counter electrode plate can be selected.

As described above, the method for producing the battery 1500 shown in FIG. 14 includes the step of forming the seal 314 in advance before the electrode plate and the counter electrode plate are laminated. Therefore, the seal 314 is formed on the outer circumference of at least one of the electrode current collector 216 and the counter electrode current collector 220. This can significantly reduce the risk of a short circuit between the electrode layer 110 and the counter electrode layer 122 caused by direct contact between the electrode current collector 216 and the counter electrode current collector 220.

Controlling the thickness of the seal 314 significantly contributes to an improvement in the reliability of the battery 1500. The thickness of the seal 314 is controlled by adjusting the thickness of the coating. In this case, the thickness of the seal 314 may be controlled such that the seal 314 does not cover a large portion of the edges of the electrode current collector 216 and the counter electrode current collector 220, i.e., the seal 314 does not protrude outward from the edges of the current collectors.

The position at which the seal 314 is formed, the region in which the electrode layer 110 is formed, the region in which the counter electrode layer 122 is formed, the region in which the electrolyte layer 133 is formed, and the sizes of the electrode current collector 216 and the counter electrode current collector 220 may be adjusted. This allows the batteries shown in embodiment 1 and the modifications to be produced. By stacking a plurality of batteries, cell stacks shown in embodiment 2 described later can be produced.

In the method for producing the battery in the present embodiment, pressure may be applied when the electrode plate and the counter electrode plate are laminated or when a plurality of batteries are stacked. The electrode plate or the counter electrode plate may be pressurized individually, and then the seal 314 may be formed.

Embodiment 2

Embodiment 2 will be described. In the following description, differences from embodiment 1 and the modifications described above will be mainly described, and the description of common features will be omitted or simplified.

Figure 15:
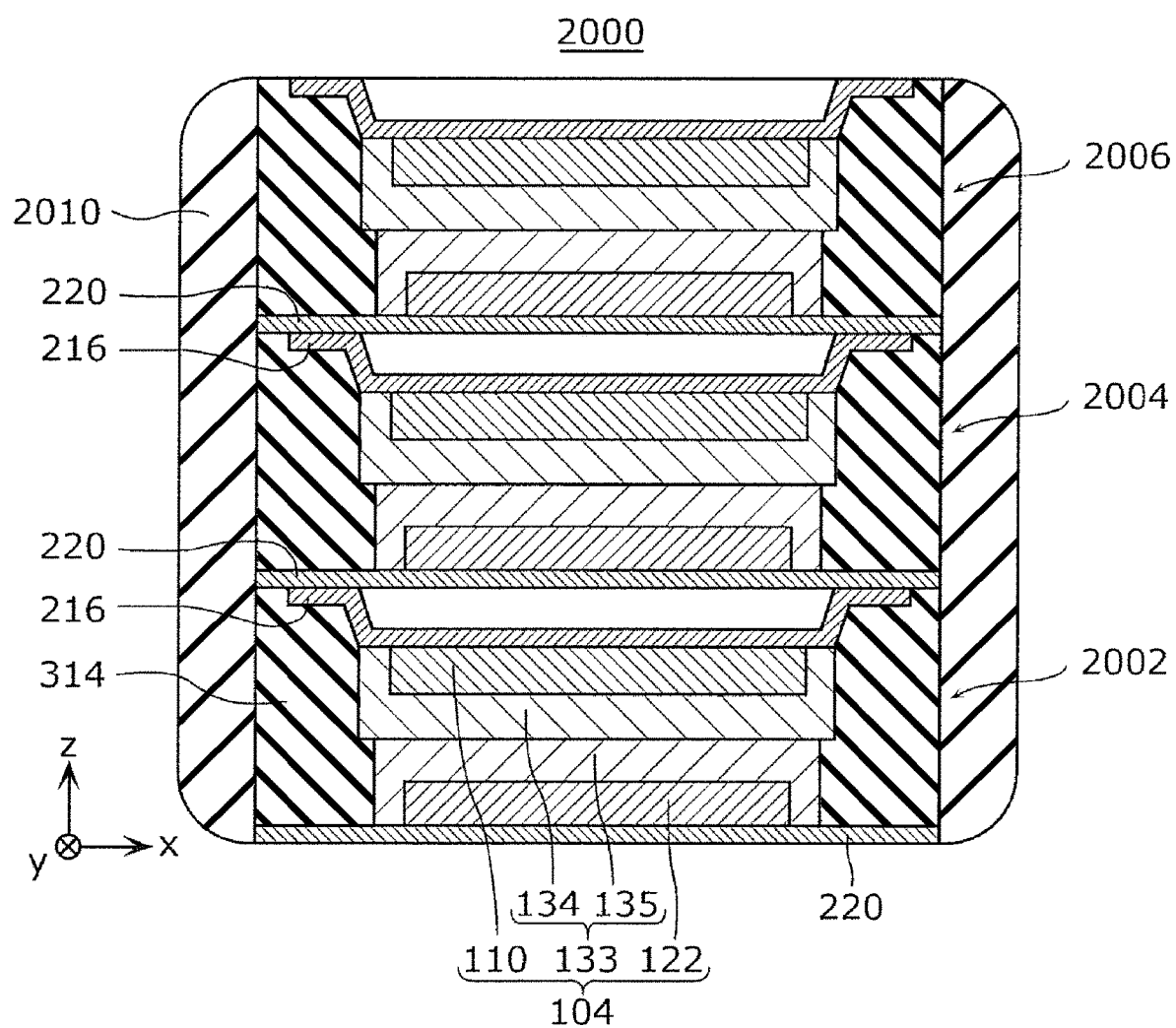
FIG. 15 shows a schematic structure of a cell stack in embodiment 2.

FIG. 15 is a cross-sectional view showing a schematic structure of a cell stack 2000 in embodiment 2. The cell stack 2000 in embodiment 2 is prepared by stacking a plurality of the batteries in embodiment 1 or one of the modifications described above and connecting them in series.

In the example shown in FIG. 15, the cell stack 2000 has a structure including three batteries 2002, 2004, and 2006 stacked in this order. The batteries 2002, 2004, and 2006 have the same structure. One of the batteries 2002, 2004, and 2006 is an example of the first battery in the claims, and another one of them is an example of the second battery.

For example, each of the batteries 2002, 2004, and 2006 has substantially the same structure as the battery 1500 in modification 5 of embodiment 1. At least one of the batteries 2002, 2004, and 2006 may be the battery 1000 in embodiment 1 or may be at least one of the batteries 1100 to 1800 in modifications 1 to 8.

In the cell stack 2000, by joining the electrode current collector of one battery to the counter electrode current collector of another battery, these batteries are stacked. Specifically, as shown in FIG. 15, the electrode current collector 216 of the battery 2002 is joined to the counter electrode current collector 220 of the battery 2004. The electrode current collector 216 of the battery 2004 is joined to the counter electrode current collector 220 of the battery 2006. Each electrode current collector 216 and its corresponding counter electrode current collector 220 may be joined directly or may be joined using a conductive adhesive or by welding. The batteries 2002, 2004, and 2006 are connected in series.

As shown in FIG. 15, the cell stack 2000 further includes an electrically insulating member 2010. The electrically insulating member 2010 covers the side surfaces of the batteries 2002, 2004, and 2006. This allows the stacked state of the batteries in the cell stack 2000 to be firmly maintained. The electrically insulating member 2010 is formed using an electrically insulating resin material. The electrically insulating member 2010 may be formed using, for example, the material of the seal 314.

The number of batteries included in the cell stack 2000 may be three or more or may be two. By adjusting the number of batteries stacked, desired cell characteristics can be obtained.

When the cell stack is formed, a plurality of batteries may be connected in parallel depending on required characteristics. The cell stack may include two or more batteries connected in parallel and two or more batteries connected in series. This allows a small-volume high-capacity battery to be obtained.

In the structure described above, by stacking a plurality of batteries in series, a high voltage can be obtained. The cell stack obtained is of the series connection type and has a low short circuit risk and high electric connection reliability. Specifically, in the series stacked bipolar structure formed, the risk of a short circuit between current collectors is low, and an external force applied to the electric power generating elements 104 can be reduced. Moreover, the reliability of electric connection is high.

Figure 16:
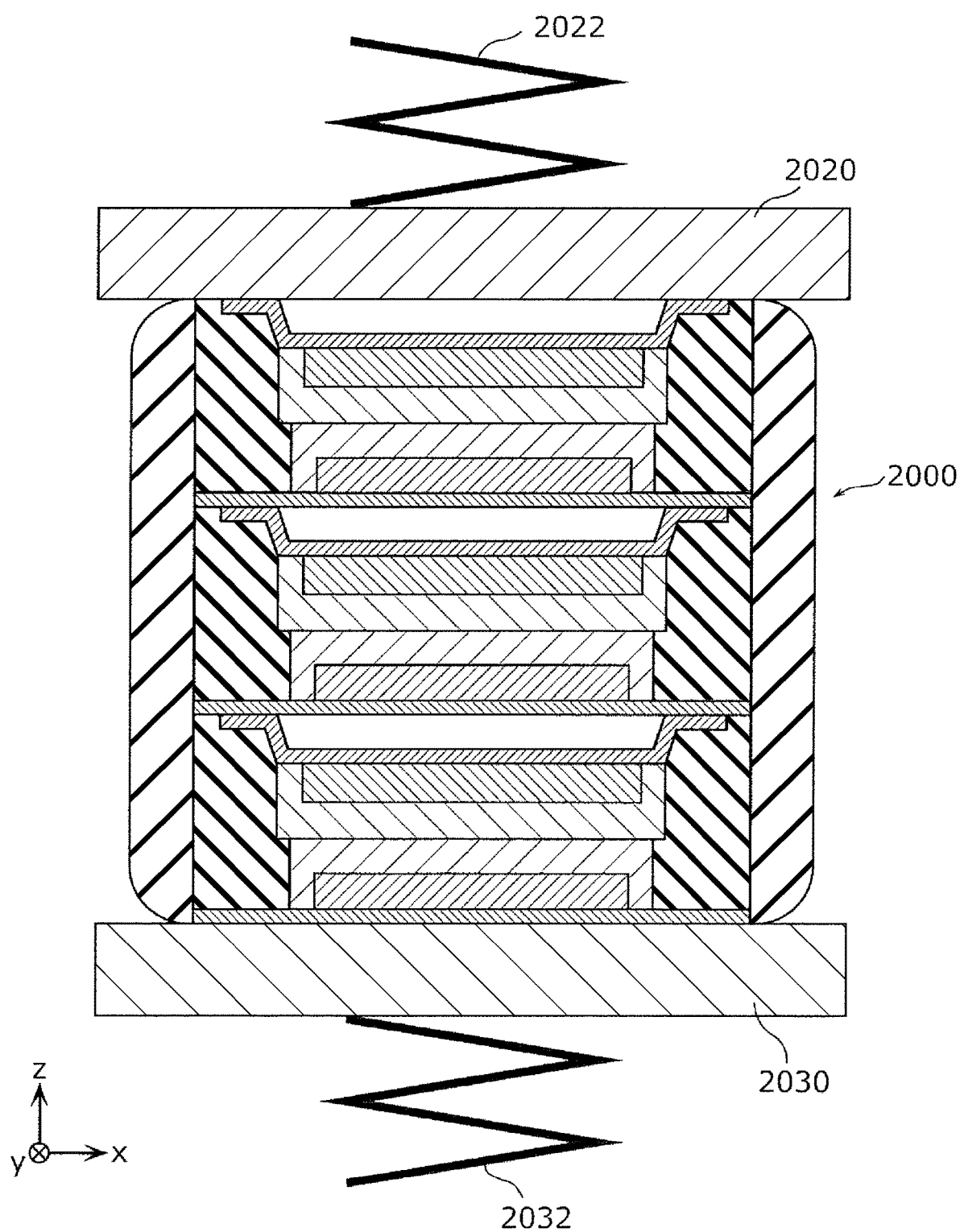
FIG. 16 schematically shows an example of the use of the cell stack in embodiment 2.

FIG. 16 schematically shows an example of the use of the cell stack 2000 in embodiment 2. As shown in FIG. 16, the cell stack 2000 is sandwiched between, for example, an electrode holder 2020 and a counter electrode holder 2030 and pressed by these holders. An electrode lead wire 2022 is attached to the electrode holder 2020. A counter electrode lead wire 2032 is attached to the counter electrode holder 2030. The electrode holder 2020, the counter electrode holder 2030, the electrode lead wire 2022, and the counter electrode lead wire 2032 are formed of, for example, an electrically conductive metal material. A current can thereby be outputted from the cell stack 2000 through the electrode lead wire 2022 and the counter electrode lead wire 2032.

Even when the batteries or the cell stack sandwiched between the electrode holder 2020 and the counter electrode holder 2030 is pressurized, each first stack portion 416 receives the pressure. Therefore, an improvement in electric connection and prevention of the breakage of the electric power generating element 100 can be achieved simultaneously.

The cell stack 2000 may be contained in a sealing case. The sealing case used may be a laminated bag, a metal can, or a resin case. The use of the sealing case can prevent deterioration of the electric power generating elements caused by water.

[Modifications]

A plurality of modifications of embodiment 2 will be described. In the following description of the plurality of modifications, differences from embodiment 2 will be mainly described, and the description of common features will be omitted or simplified.

<Modification 1>

Figure 17:
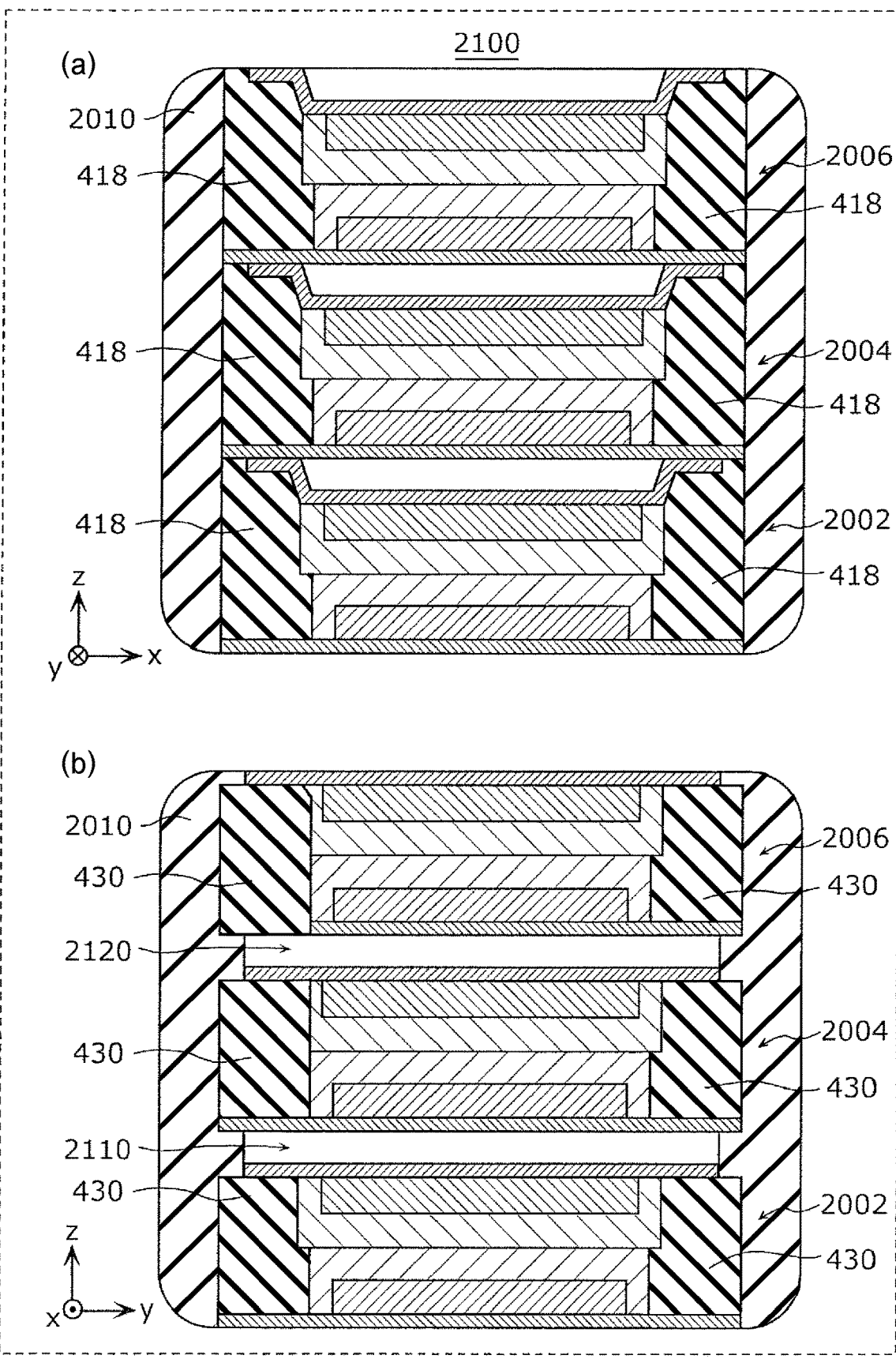
FIG. 17 shows a schematic structure of a cell stack in modification 1 of embodiment 2.

First, modification 1 of embodiment 2 will be described using FIG. 17. FIG. 17 shows a schematic structure of a cell stack 2100 in modification 1 of embodiment 2. Specifically, FIGS. 17(*a*) and 17(*b*) show two cross sections parallel to the direction of the thickness of the cell stack 2100, and these cross sections (an xz cross section and a yz cross section) are orthogonal to each other.

In the cell stack 2100 in modification 1, the positions of first stack portions 418 are adjusted for each battery. Specifically, the cell stack 2100 has a structure including three stacked batteries 2002, 2004, and 2006. In each of the three batteries 2002, 2004, and 2006 in modification 1, the electric power generating element 104 has a rectangular shape in plan view as shown in FIG. 10, and two first stack portions 418 are disposed along opposite sides of the rectangle.

In the cell stack 2100, the batteries shown in FIG. 10 are stacked with their orientations aligned. Specifically, as shown in FIG. 17(a), the first stack portions 418 of the three batteries 2002, 2004, and 2006 are aligned in the thickness direction. More specifically, the first stack portions 418 of the battery 2002 are in contact with the first stack portions 418 of the battery 2004. The first stack portions 418 of the battery 2004 are in contact with the first stack portions 418 of the battery 2006.

Therefore, when an external force is applied, the stress acting on the electric power generating elements 104 can be reduced, and delamination, breakage, etc. of the electric power generating elements 104 in the cell stack 2100 can be prevented. Specifically, the mechanical strength of the electric power generating elements 104 in the cell stack 2100 against the external force can be increased.

As shown in FIG. 17(b), the third stack portions 430 of the three batteries 2002, 2004, and 2006 are aligned in the thickness direction. In this case, the third stack portion 430 of the battery 2002 is not in contact with the third stack portion 430 of the battery 2004, and a space 2110 is interposed between these batteries. The third stack portion 430 of the battery 2004 is not in contact with the third stack portion 430 of the battery 2006, and a space 2120 is interposed between these batteries.

Specifically, in the cell stack 2100, a space is present between stacked cells. Specifically, as shown in FIG. 17(b), the space 2110 is provided between the batteries 2002 and 2004. The space 2120 is provided between the batteries 2004 and 2006.

The spaces 2110 and 2120 serve as heat dissipation spaces. Since the orientations of the heat dissipation spaces are aligned, good ventilation is obtained when, for example, a cooling fan is used, and the cell stack can be cooled efficiently. Moreover, the spaces 2110 and 2120 can absorb volume expansion of the batteries caused by charge/discharge. The spaces 2110 and 2120 can be used as channels for electric wiring or optical communications.

<Modification 2>

Figure 18:
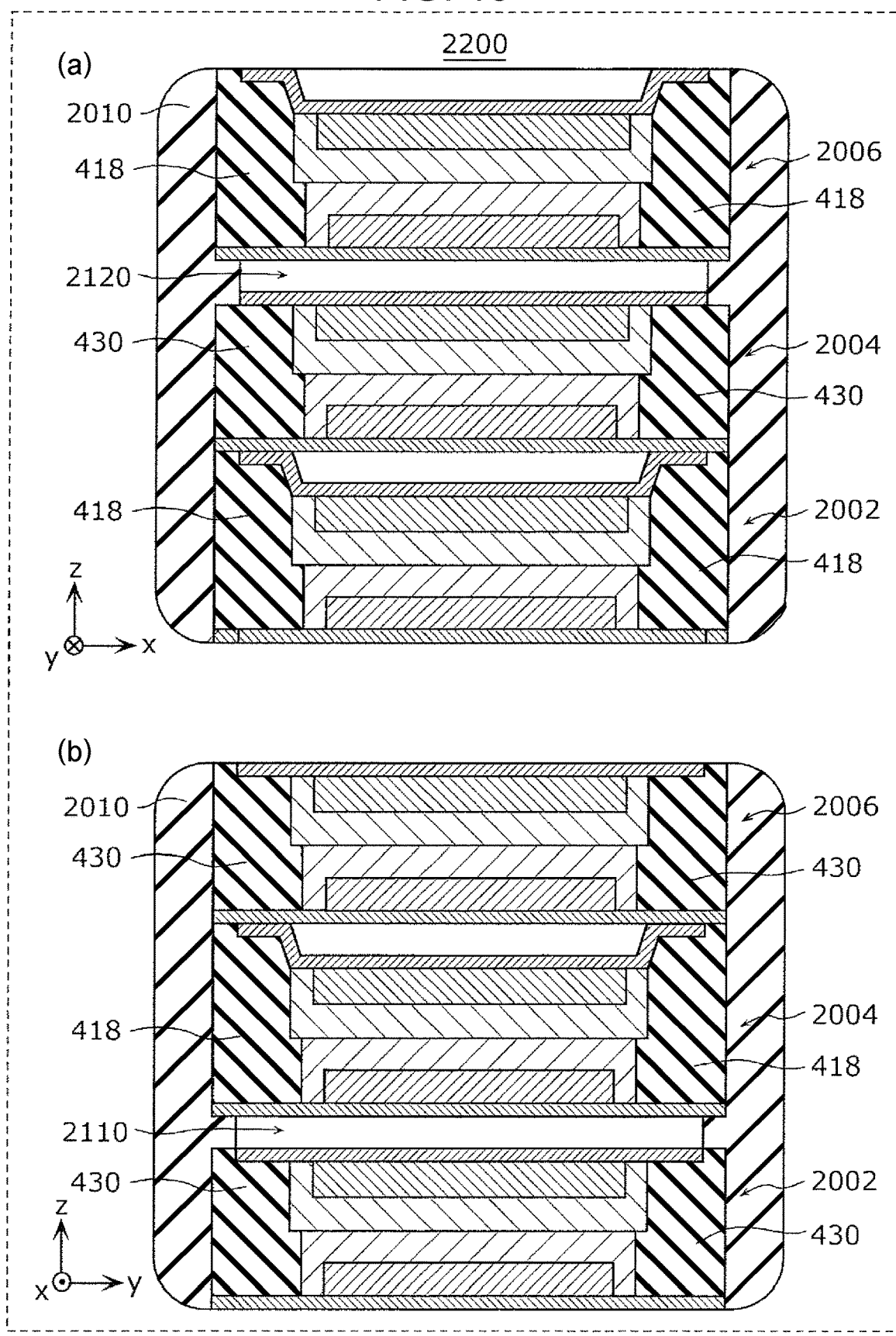
FIG. 18 shows a schematic structure of a cell stack in modification 2 of embodiment 2.

Next, modification 2 of embodiment 2 will be described using FIG. 18. FIG. 18 shows a schematic structure of a cell stack 2200 in modification 2 of embodiment 2. Specifically, FIGS. 18(a) and 18(b) show two cross sections parallel to the direction of the thickness of the cell stack 2200, and these cross sections (an xz cross section and a yz cross section) are orthogonal to each other.

In the cell stack 2200 shown in FIG. 18, the first stack portions of a battery are in contact with portions of another battery other than its first stack portions. Specifically, in the cell stack 2200, the orientation of the battery 2004 differs from that in the cell stack 2100 in modification 1. More specifically, the battery 2004 shown in FIG. 18 is rotated 90° from the battery 2004 shown in FIG. 17. In the cell stack 2200 in the present modification, each battery stacked on another battery is rotated 90°.

Therefore, as shown in FIG. 18(a), the first stack portions 418 of the battery 2002, the third stack portion 430 of the battery 2004, and the first stack portions 418 of the battery 2006 are aligned in the thickness direction. The first stack portions 418 of the battery 2002 are in contact with the third stack portion 430 of the battery 2004. The third stack portion 430 of the battery 2004 is not in contact with the first stack portions 418 of the battery 2006, and a space 2120 is interposed between these batteries.

As shown in FIG. 18(b), the third stack portion 430 of the battery 2002, the first stack portions 418 of the battery 2004, and the third stack portion 430 of the battery 2006 are aligned in the thickness direction. The third stack portion 430 of the battery 2002 is not in contact with the first stack portions 418 of the battery 2004, and a space 2110 is interposed between these batteries. The first stack portions 418 of the battery 2004 are in contact with the third stack portion 430 of the battery 2006.

As described above, in the cell stack 2200 shown in FIG. 18, since the first stack portions 418 of the batteries are stacked in a hash symbol shape, the mechanical strength of the cell stack 2200 is further improved. Specifically, the mechanical strength of the electric power generating elements 104 in the cell stack 2200 against an external force can be further increased. In the cell stack 2200, the spaces 2110 and 2120 serve as heat dissipation spaces, so that the heat dissipation properties can be improved, as in modification 1.

Other Embodiments

One or a plurality of modes of the battery and the cell stack have been described based on the embodiments. However, the present disclosure is not limited to these embodiments. Various modifications to the embodiments that are conceivable by a person of skill in the art and modes obtained by combining components in difference embodiments are also included in the scope of the present disclosure, so long as they do not depart from the spirit of the present disclosure.

For example, in the above embodiments, the seal 310, 312, 314, 316, or 317 may not be in contact with the electrode current collector 210, 212, 214, 216, or 218. For example, the electrode layer 110 may be formed over the entire electrode current collector 210, 212, 214, 216, or 218, and the seal 310, 312, 314, 316, or 317 may be located between the electrode layer 110 and the counter electrode current collector 220 or 222 and may be in contact with the electrode layer 110.

Similarly, the seal 310, 312, 314, 316, or 317 may not be in contact with the counter electrode current collector 220 or 222. For example, the counter electrode layer 120 or 122 may be formed over the entire counter electrode current collector 220 or 222, and the seal 310, 312, 314, 316, or 317 may be located between the counter electrode layer 120 or 122 and the electrode current collector 210, 212, 214, 216 or 218 and may be in contact with the counter electrode layer 120 or 122.

For example, the seal 310, 312, 314, 316 or 317 may not be in contact with the electric power generating element 100, 102, 104, or 106.

For example the electrolyte layer 130 may not be a solid electrolyte layer but may be an electrolyte solution.

For example, in the description of the examples in the above embodiments and modifications, the thickness of the seal 310, 312, 314, 316, or 317 differs from the thickness of the electric power generating element 100, 102, or 104, and the thickness T1 of each first stack portion thereby differs from the thickness T2 of each second stack portion, but this is not a limitation. For example, at least one of the electrode current collector and the counter electrode current collector may have different thicknesses.

Specifically, in the first stack portion 410, 412, 414, 416, 418, or 419, the thickness of the seal 310, 312, 314, 316, or 317 may be the same as the thickness of the electric power generating element 100, 102, or 104 or may be smaller than the thickness of the electric power generating element 100, 102 or 104. The thickness of at least one of the electrode current collector 210, 212, 214, 216, or 218 and the counter electrode current collector 220 or 222 may be larger in the first stack portion 410, 412, 414, 416, 418, or 419 than in the second stack portion 420. For example, the thickness of the first plate portion 210*a*, 212*a*, 214*a*, 216*a*, or 218*a* of each electrode current collector may be larger than the thickness of the second plate portion 210*b* thereof. Alternatively, the thickness of the first plate portion 220*a*, 222*a*, 224*a*, 226*a*, or 228*a* of each counter electrode current collector may be larger than the thickness of the second plate portion 220*b* thereof.

Various modifications, replacements, additions, omissions, etc. may be made to the above embodiments within the scope of the claims or equivalents thereof.

What is claimed is:

1. A battery, comprising:
a unit cell including an electrode layer, a counter electrode layer facing the electrode layer, and a solid electrolyte layer disposed between the electrode layer and the counter electrode layer;
an electrode current collector in contact with the electrode layer;
a counter electrode current collector in contact with the counter electrode layer; and
a seal disposed between the electrode current collector and the counter electrode current collector,
wherein the unit cell is disposed between the electrode current collector and the counter electrode current collector,
wherein, when the battery is viewed in a direction of a thickness of the battery,
the electrode current collector includes a first region that does not overlap the electrode layer, the first region including at least part of an outer circumference of the electrode current collector;
the counter electrode current collector includes a second region that does not overlap the counter electrode layer, the second region including at least part of an outer circumference of the counter electrode current collector; and
the seal overlaps the first region and the second region, and
wherein a thickness of a first stack portion is larger than a thickness of a second stack portion,
the first stack portion including a first sealing portion that is at least part of the seal; a part of the electrode current collector, the part overlapping the first sealing portion when the battery is viewed in the direction of the thickness of the battery; and a part of the counter electrode current collector, the part overlapping the first sealing portion when the battery is viewed in the direction of the thickness of the battery, and
the second stack portion including the unit cell; a part of the electrode current collector, the part overlapping the unit cell when the battery is viewed in the direction of the thickness of the battery; and a part of the counter electrode current collector, the part overlapping the unit cell when the battery is viewed in the direction of the thickness of the battery.

2. The battery according to claim 1, wherein the seal surrounds the unit cell.

3. The battery according to claim 1, wherein when the battery is viewed in the direction of the thickness of the battery, the first stack portion includes a plurality of island portions that are separated from each other and located outside the unit cell.

4. The battery according to claim 1, wherein when the battery is viewed in the direction of the thickness of the battery, the first stack portion has an elongated shape disposed outside the unit cell and extending along an outer circumference of the unit cell.

5. The battery according to claim 1, wherein when the battery is viewed in the direction of the thickness of the battery, the unit cell has a rectangular shape, and
the first stack portion includes two portions located along two opposite sides of the rectangular shape.

6. The battery according to claim 1, wherein when the battery is viewed in the direction of the thickness of the battery, the first stack portion is disposed continuously over an entire circumference of the unit cell.

7. The battery according to claim 1, wherein the first stack portion protrudes further from opposite sides in the direction of the thickness of the battery than the second stack portion.

8. The battery according to claim 1, wherein the seal is in contact with the unit cell.

9. The battery according to claim 1, wherein the seal includes a first seal containing a first material and a second seal containing a second material different from the first material,
the first seal is located closer to the electrode current collector than the second seal is, and
the second seal is located closer to the counter electrode current collector than the first seal is.

10. The battery according to claim 1, wherein the seal contains a first material, and
the first material is an electrically insulating material having no ion conductivity.

11. The battery according to claim 9, wherein the first material contains a resin.

12. The battery according to claim 9, wherein the first material is at least one selected from the group consisting of epoxy resins, acrylic resins, polyimide resins, and silsesquioxanes.

13. The battery according to claim 1, wherein the seal contains a particulate metal oxide material.

14. The battery according to claim 1, wherein the seal further includes a second sealing portion different from the first sealing portion, and
a thickness of a third stack portion is equal to the thickness of the second stack portion,
the third stack portion including the second sealing portion; a part of the electrode current collector, the part overlapping the second sealing portion when the battery is viewed in the direction of the thickness of the battery; and a part of the counter electrode current collector, the part overlapping the second sealing portion when the battery is viewed in the direction of the thickness of the battery.

15. A cell stack, comprising:
a first battery; and
a second battery stacked on the first battery,
wherein each of the first battery and the second battery includes
a unit cell including an electrode layer, a counter electrode layer facing the electrode layer, and a solid electrolyte layer disposed between the electrode layer and the counter electrode layer;

an electrode current collector in contact with the electrode layer;

a counter electrode current collector in contact with the counter electrode layer; and a seal disposed between the electrode current collector and the counter electrode current collector, the unit cell being disposed between the electrode current collector and the counter electrode current collector, wherein, when each of the first battery and the second battery is viewed in a direction of a thickness of each of the first battery and the second battery, the electrode current collector includes a first region that does not overlap the electrode layer, the first region including at least part of an outer circumference of the electrode current collector;

the counter electrode current collector includes a second region that does not overlap the counter electrode layer, the second region including at least part of an outer circumference of the counter electrode current collector; and the seal overlaps the first region and the second region, and wherein, in each of the first battery and the second battery, a thickness of a first stack portion is larger than a thickness of a second stack portion, the first stack portion including a first sealing portion that is at least part of the seal; a part of the electrode current collector, the part overlapping the first sealing portion when each of the first battery and the second battery is viewed in the direction of the thickness of each of the first battery and the second battery; and a part of the counter electrode current collector, the part overlapping the first sealing portion when each of the first battery and the second battery is viewed in the direction of the thickness of each of the first battery and the second battery, and the second stack portion including the unit cell; a part of the electrode current collector, the part overlapping the unit cell when each of the first battery and the second battery is viewed in the direction of the thickness of each of the first battery and the second battery; and a part of the counter electrode current collector, the part overlapping the unit cell when each of the first battery and the second battery is viewed in the direction of the thickness of each of the first battery and the second battery.

16. The cell stack according to claim 15, wherein a space is present between the first battery and the second battery.

17. The cell stack according to claim 15, wherein the first stack portion of the first battery is in contact with a portion of the second battery that differs from the first stack portion of the second battery.

* * * * *